(12) United States Patent
Miyagawa et al.

(10) Patent No.: US 12,509,483 B2
(45) Date of Patent: Dec. 30, 2025

(54) METHOD FOR PRODUCING NUCLEIC ACID OLIGOMERS

(71) Applicant: SUMITOMO CHEMICAL COMPANY, LIMITED, Chuo-ku (JP)

(72) Inventors: Takuya Miyagawa, Osaka (JP); Hideki Okumura, Osaka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 903 days.

(21) Appl. No.: 17/767,825

(22) PCT Filed: Aug. 25, 2020

(86) PCT No.: PCT/JP2020/032020
§ 371 (c)(1),
(2) Date: Apr. 8, 2022

(87) PCT Pub. No.: WO2021/070494
PCT Pub. Date: Apr. 15, 2021

(65) Prior Publication Data
US 2024/0116977 A1 Apr. 11, 2024

(30) Foreign Application Priority Data
Oct. 11, 2019 (JP) .................. 2019-187930

(51) Int. Cl.
C07H 21/00 (2006.01)

(52) U.S. Cl.
CPC ................... C07H 21/00 (2013.01)

(58) Field of Classification Search
None
See application file for complete search history.

(56) References Cited

U.S. PATENT DOCUMENTS

| 2007/0282097 A1 | 12/2007 | Ohgi et al. |
| 2009/0149645 A1 | 6/2009 | Shiba |
| 2011/0178284 A1 | 7/2011 | Wada et al. |
| 2014/0206856 A1 | 7/2014 | Aoki et al. |
| 2021/0238217 A1 | 8/2021 | Tanaka et al. |

FOREIGN PATENT DOCUMENTS

| CN | 101426805 A | 5/2009 |
| CN | 102574888 A | 7/2012 |
| CN | 103906758 A | 7/2014 |
| CN | 110198948 A | 9/2019 |
| CN | 112020507 A | 12/2020 |
| CN | 116209668 A | 6/2023 |
| EP | 2 749 565 A1 | 7/2014 |
| EP | 3 527 578 A1 | 8/2019 |
| TW | 202146012 A | 12/2021 |
| WO | WO 2006/022323 A1 | 3/2006 |
| WO | WO 2007/099896 A1 | 9/2007 |

(Continued)

OTHER PUBLICATIONS

International Search Report issued Nov. 2, 2020 in PCT/JP2020/032020 (submitting English translation only), 3 pages.
International Preliminary Report on Patentability and Written Opinion issued Apr. 12. 2022 in PCT/JP2020/032020 (submitting English translation only), 4 pages.
Ohgi, T., et al., "A New RNA Synthetic Method with a 2'-O-(2-Cyanoethoxymethyl) Protecting Group", Organic Letters, 2005, vol. 7, No. 16, pp. 3477-3480.
Extended European Search Report issued Feb. 26, 2024, in corresponding European Patent Application No. 20875506.6, 8 pages.

(Continued)

Primary Examiner — Patrick T Lewis
(74) Attorney, Agent, or Firm — Oblon, McClelland, Maier & Neustadt, L.L.P.

(57) ABSTRACT

The present invention provides an efficient process for preparing a nucleic acid oligomer, in particular, a process for deprotecting efficiently a protecting group of hydroxy group of a ribose in a nucleic acid oligomer. Specifically, the present invention also provides a process for preparing a nucleic acid oligomer represented by formula (4), which comprises contacting a nucleic acid oligomer represented by formula (3) with a fluoride ion under an atmosphere of an inert gas or inert gases containing 15% or less of oxygen concentration (wherein the definitions of each groups described in formula (3) and formula (4) are the same as defined in the Description).

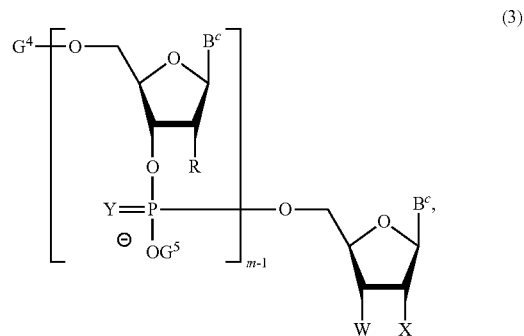

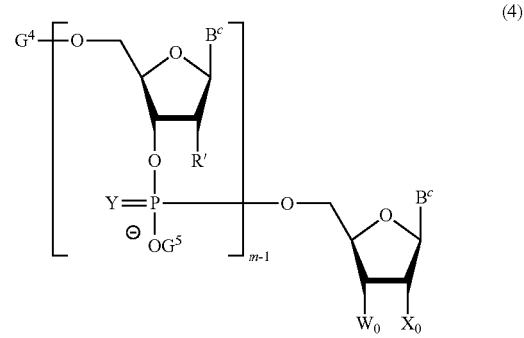

22 Claims, No Drawings

Specification includes a Sequence Listing.

(56) References Cited

FOREIGN PATENT DOCUMENTS

| WO | WO 2011/034072 A1 | 3/2011 |
| WO | WO 2013/027843 A1 | 2/2013 |
| WO | WO 2018/070543 A1 | 4/2018 |
| WO | WO 2019/208571 A1 | 10/2019 |

OTHER PUBLICATIONS

Combined Chinese Office Action and Search Report issued Jun. 7, 2024, in corresponding Chinese Patent Application No. 202080070607.0 (with English Translation), 14 pages.
U.S. Appl. No. 18/246,393, filed Mar. 23, 2023, Takuya Miyagawa et al.
U.S. Appl. No. 17/767,825, filed Apr. 8, 2022, Takuya Miyagawa et al.

METHOD FOR PRODUCING NUCLEIC ACID OLIGOMERS

CROSS-REFERENCE TO RELATED APPLICATIONS

The present application is a 35 U.S.C. § 371 national stage patent application of International patent application PCT/JP2020/032020, filed on Aug. 25, 2020, which is based on and claims the benefits of priority to Japanese Application No. 2019-187930, filed on Oct. 11, 2019. The entire contents of these applications are incorporated herein by reference.

TECHNICAL FIELD

This application claims priority to and the benefit of Japanese Patent Application No. 2019-187930 filed Oct. 11, 2019 according to the Paris Convention, the entire contents of which are incorporated herein by reference.

The present invention relates to a process for preparing a nucleic acid oligomer containing ribose, and in more details, relates to a deprotecting method of a protecting group of hydroxy group in a ribose which is contained in a nucleic acid oligomer.

BACKGROUND ART

RNA, which is a nucleic acid oligomer containing ribose, can be applied as a RNA probe, an antisense RNA, a ribozyme, a siRNA, or an aptamer and the others, which is a useful material.

A nucleic acid oligomer can be synthesized according to a solid phase synthesis, and in the solid phase synthesis, a phosphoramidite (hereinafter, referred to as "amidite") of nucleoside is used as a starting material. A nucleic acid oligomer which is synthesized by an elongation of a nucleic acid on a solid support is cut off from the solid support, and then in the nucleic acid oligomer containing ribose, a protecting group of hydroxy group at 2' position of the ribose is excluded by deprotection to prepare a desired nucleic acid oligomer. The purity of the nucleic acid oligomer which is synthesized by such a method is not necessarily a satisfactory one because the process is passed through multi-steps such as an elongation step of nucleic acid on solid support, a cutting off step from a solid support, and a deprotection step of each protecting group, which as a result, the synthesis is not efficient (see Patent Literatures 1 and 2).

CITATION LIST

Patent Literature

Patent Literature 1: WO 2006/022323 A1
Patent Literature 2: WO 2013/027843 A1

SUMMARY OF THE INVENTION

Problems to be Solved by Invention

An object of the present invention is to provide an efficient process for preparing a nucleic acid oligomer.

Means to Solve Problems

The present inventors have intensively studied to achieve the above object, and can find out that a fluoride ion can contact with a nucleic acid oligomer under an atmosphere of an inert gas or inert gases containing the oxygen concentration below a certain level to deprotect effectively a protecting group of hydroxy group in a ribose which is contained in the nucleic acid oligomer, and as a result, can provide an efficient process for preparing a nucleic acid oligomer.

The present invention has been completed on the basis of these findings, and encompasses the following aspects, but are not limited thereto.

[1] A process for preparing a nucleic acid oligomer represented by formula (4):

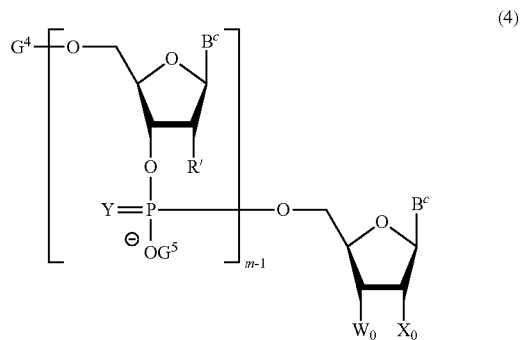

(wherein
R' is identical to or different from each other and each independently represents a hydroxy group, a hydrogen atom, a fluorine atom, a methoxy group, a 2-methoxyethyl group, or OQ' group, Q' is identical to or different from each other and each independently represents a methylene group which is bonded to a carbon atom at 4' position of ribose, an ethylene group which is bonded to a carbon atom at 4' position of ribose, or an ethylidene group which is bonded to a carbon atom at 4' position of ribose, the definitions of substituents $G^4$, $G^5$, Y, and $B^c$ and m of the formula (4) are the same as those defined in the below formula (3), $W_0$ represents a hydroxy group, $X_0$ are the same as those defined in the below R' group.

when m is an integer of 3 or more, the nucleic acid oligomer represented by formula (4) represents a nucleic acid oligomer which may be incorporated by a non-nucleotide linker instead of the number of p (with the proviso that p is a positive integer satisfying an equation: m−1>p) of nucleotides between the respective nucleotides at 5' terminus and 3' terminus), which comprises contacting a nucleic acid oligomer represented by formula (3):

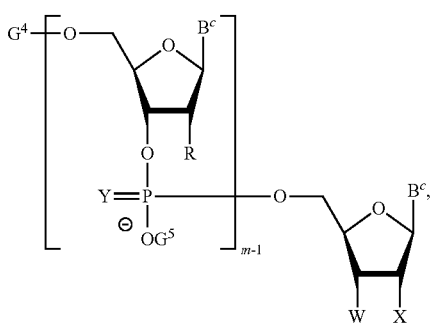

(wherein,
- $G^4$ represents a hydrogen atom or a protecting group of hydroxy group,
- $G^5$ represents an ammonium ion, an alkylammonium ion, an alkali metal ion, a hydrogen ion or a hydroxyalkylammonium ion,
- $B^c$ represents a nucleobase, each of which is independently identical to or different from each other,
- R are identical to or different from each other and each independently represents a hydrogen atom, a fluorine atom or OQ group,
- Q is identical to or different from each other and each independently represents a tert-butyldimethylsilyl group, a methyl group, a 2-methoxyethyl group, a methylene group which is bonded to a carbon atom at 4' position of ribose, an ethylene group which is bonded to a carbon atom at 4' position of ribose, an ethylidene group which is bonded to a carbon atom at 4' position of ribose, or a protecting group represented by formula (1):

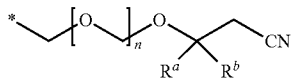

(wherein
- $R^a$ and $R^b$ are identical to or different from each other and each independently represents a methyl group, an ethyl group or a hydrogen atom,
- a bond marked with * represents a bond to an oxygen atom of OQ group,
- n is an integer of 1 to 5,
- with the proviso that $R^a$ and $R^b$ do not represent a hydrogen atom at the same time.),
- Y are identical to or different from each other and each independently represents an oxygen atom or a sulfur atom,
- m is an integer of 2 or more to 200 or less,
- W and X are defined as either the following (a) or (b):
- (a) when W represents a hydroxy group, X is the same as defined as those of the above R group,
- (b) when X represents a hydroxy group, W represents a OV group,
- V represents a tert-butyldimethylsilyl group, or the group represented by the above formula (1).
- with proviso that at least one group selected from the above R group, W group and X group represents a hydroxy group which is protected with a protecting group represented by the above formula (1), and when m is an integer of 3 or more, the nucleic acid oligomer represented by formula (3) represents a nucleic acid oligomer which may be incorporated by a non-nucleotide linker instead of the number of p (with the proviso that p is a positive integer satisfying an equation: m−1>p) of nucleotides between the respective nucleotides at 5' terminus and 3' terminus)

with a fluoride ion under an atmosphere of an inert gas or inert gases containing 15% or less of oxygen concentration (hereinafter, the method is referred to as "process for preparation of the present invention", or "Present process").

[2] The process according to [1] wherein the non-nucleotide linker is a linker comprising an amino acid backbone.

[3] The process according to [2] wherein the linker comprising an amino acid backbone is a linker having a structure selected from the following formula (A14-1), (A14-2) or (A14-3).

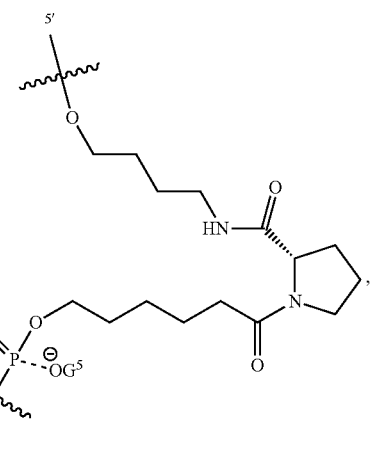

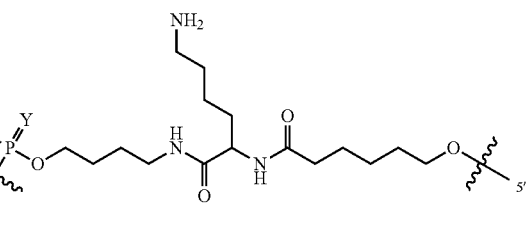

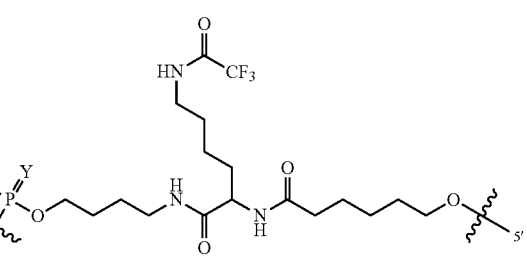

(wherein a symbol of 5' and 3' represents a 5' terminus side and 3' terminus side respectively of the nucleic acid oligomer.).

[4] The process according to any one of [1] to [3] wherein W represents a hydroxy group, X represents a R group, $W_0$ represents a hydroxy group, and $X_0$ represents a R' group.

[5] The process according to any one of [1] to [4] wherein the fluoride ion source is tetraalkylammonium fluoride.

[6] The process according to any one of [1] to [5] wherein the tetraalkylammonium fluoride is tetra-n-butylammonium fluoride (TBAF).

[7] The process according to any one of [1] to [6] wherein the reaction is conducted under an atmosphere of an inert gas or inert gases containing 10% or less of oxygen concentration.

[8] The process according to any one of [1] to [6] wherein the reaction is conducted under an atmosphere of an inert gas or inert gases containing 5% or less of oxygen concentration.

[9] The process according to any one of [1] to [6] wherein the reaction is conducted under an atmosphere of an inert gas or inert gases containing 0% of oxygen concentration.

[10] The process according to any one of [1] to [9] wherein a duration required for addition of the total amounts of fluoride ions to the nucleic acid oligomer represented by formula (3) is 30 minutes or more.

[11] The process according to any one of [1] to [10] wherein among the R group, the W group, and the X group in ratio of a protecting group represented by the above formula (1) is 5% or more.

[12] The process according to any one of [1] to [10] wherein among the R group, the W group, and the X group in the nucleic acid oligomer represented by formula (3), the ratio of a protecting group represented by the above formula (1) is 10% or more.

[13] The process according to any one of [1] to [10] wherein among the R group, the W group, and the X group in the nucleic acid oligomer represented by formula (3), the ratio of a protecting group represented by the above formula (1) is 20% or more.

[14] The process according to any one of [1] to [10] wherein among the R group, the W group, and the X group in the nucleic acid oligomer represented by formula (3), the ratio of a protecting group represented by the above formula (1) is 30% or more.

[15] The process according to any one of [1] to [10] wherein among the R group, the W group, and the X group in the nucleic acid oligomer represented by formula (3), the ratio of a protecting group represented by the above formula (1) is 40% or more.

[16] The process according to any one of [1] to [10] wherein among the R group, the W group, and the X group in ratio of a protecting group represented by the above formula (1) is 50% or more.

[17] The process according to any one of [1] to [10] wherein among the R group, the W group, and the X group in the nucleic acid oligomer represented by formula (3), the ratio of a protecting group represented by the above formula (1) is 60% or more.

[18] The process according to any one of [1] to [10] wherein among the R group, the W group, and the X group in the nucleic acid oligomer represented by formula (3), the ratio of a protecting group represented by the above formula (1) is 70% or more.

[19] The process according to any one of [1] to [10] wherein among the R group, the W group, and the X group in the nucleic acid oligomer represented by formula (3), the ratio of a protecting group represented by the above formula (1) is 80% or more.

[20] The process according to any one of [1] to [10] wherein among the R group, the W group, and the X group in the nucleic acid oligomer represented by formula (3), the ratio of a protecting group represented by the above formula (1) is 90% or more.

[21] The process according to any one of [1] to [10] wherein among the R group, the W group, and the X group in ratio of a protecting group represented by the above formula (1) is 95% or more.

[22] The process according to any one of [1] to [10] wherein among the R group, the W group, and the X group in the nucleic acid oligomer represented by formula (3), the ratio of a protecting group represented by the above formula (1) is 100%

Effect of Invention

The present invention provides an effective process for preparing a nucleic acid oligomer. According to a process of the present invention, an improvement in a purity of a nucleic acid oligomer prepared can be expected.

MODE FOR CARRYING OUT THE INVENTION

It is described a process for preparing a nucleic acid oligomer represented by formula (4) which comprises contacting a nucleic acid oligomer represented by formula (3) with a fluoride ion under an atmosphere of an inert gas or inert gases containing 15% or less of oxygen concentration to deprotect the protecting group represented by the formula (1).

In formula (1), $R^a$ and $R^b$ both may represent a methyl group, an ethyl group or a hydrogen atom, and preferably, $R^a$ represents a methyl group or an ethyl group, and $R^b$ represents a hydrogen atom, and more preferably, $R^a$ represents a methyl group, and $R^b$ represents a hydrogen atom. n is preferably an integer of 1 to 4, more preferably an integer of 1 to 3, still more preferably 1 or 2, and particularly preferably 1.

In the formula (3), at least one group selected from the R group, the W group and the X group represents a hydroxy group which is protected with a protecting group represented by the above formula (1). Among the R group, the W group, and the X group, the ratio of formula (1) may be 1% or more, preferably 5% or more, more preferably 10% or more, more preferably 20% or more, more preferably 30% or more, more preferably 40% or more, more preferably 50% or more, more preferably 60% or more, more preferably 70% or more, more preferably 80% or more, more preferably 90% or more, and still more preferably 95% or more.

The reaction for contacting the nucleic acid oligomer represented by formula (3) with a fluoride ion may be conducted by adding the fluoride ion to the nucleic acid oligomer represented by formula (3), or vice versa, by adding the nucleic acid oligomer represented by formula (3) to the fluoride ion, alternatively, by adding both of these reactants simultaneously. The method by adding the fluoride ion to the nucleic acid oligomer represented by formula (3) is preferably included. The duration required for dropwise adding the total amounts of the fluoride ion to the nucleic acid oligomer represented by formula (3) is preferably 5 minutes or more, more preferably 10 minutes or more, still more preferably 15 minutes or more, still more preferably 30 minutes or more, and further still more preferably 1 hours or more.

With respect to the addition, an dropwise addition of the fluoride ion to a solution of the nucleic acid oligomer represented by formula (3) on the surface of the solution or into the solution, over 5 minutes or more, is preferably included, the dropwise addition over 10 minutes or more is more preferably included, the dropwise addition over 15 minutes or more is more preferably included, the dropwise addition over 30 minutes or more is more preferably included, and the dropwise addition over 1 hour or more is still more preferably included.

In the step of deprotecting a protecting group of hydroxy group represented by formula (1), examples of the fluoride ion source includes typically tetraalkylammonium fluoride.

Examples of the tetraalkylammonium fluoride include tetrabutylammonium fluoride, and tetramethylammonium fluoride and the others. A tetrabutylammonium fluoride (TBAF) is more preferably included.

The amount of the fluoride ion used is within a range of usually 1 to 1,000 mole(s), preferably 1 to 500 mole(s), more preferably 2 to 200 moles, and still more preferably 4 to 100 moles, as opposed to 1 mole of a protecting group removed.

In this step, organic solvent which is inactive to the reaction is usually used, and specific examples thereof include sulfoxide solvents, nitrile solvents, ether solvents, amide solvents, ketone solvents, aliphatic hydrocarbon solvents, ester solvents, aromatic solvents, or a mixed solvents of two or more of these solvents, and among these solvents, sulfoxide solvents are preferably included. Examples of the sulfoxide solvents include dimethyl sulfoxide and the others. Examples of the nitrile solvents include acetonitrile, propionitrile, and the others.

Examples of the ether solvents include tetrahydrofuran and the others. Examples of the amide solvents include N-methyl-2-pyrrolidone and the others. Examples of the ketone solvents include acetone, methyl ethyl ketone, and the others. Examples of the aliphatic hydrocarbon solvents include hexane, heptane, and the others. Examples of the ester solvents include methyl acetate, ethyl acetate, and the others. Examples of the aromatic solvents include toluene, pyridine, and the others. Dimethyl sulfoxide, or a mixed solvent of dimethyl sulfoxide and acetonitrile is particularly preferably included.

The fluoride ion source, which is a reagent used in a step of deprotecting a protecting group of hydroxy group represented by formula (1), is used by dissolving it in a solvent, followed by usually dehydration of it. Examples of the dehydrating agents include molecular sheave, and sulfate salts, and the others, and a molecular sheave 4A is preferably used.

The amount of the solvent used is within a range of usually 5 to 8,000 L, preferably 50 to 2,000 L, and more preferably 100 to 1,600 L, as opposed to 1 mole of the nucleic acid oligomer which is supplied in a deprotecton step.

If necessary, it may be added with a capturing compound which is reacted with a nitrile compound represented by the following formula (2) as a by-product of this step to capture the nitrile compound. Examples of the capturing compound include nitroalkanes, alkylamines, amidines, thiols, thiol derivatives, or mixtures of two or more of these compounds. Examples of "nitroalkanes" include nitromethane. Examples of "alkylamines" include an straight chain alkylamine having 1 to 6 carbon atoms, and a cyclic amine having 1 to 8 carbon atoms. Specific examples thereof include methylamine, ethylamine, n-propylamine, n-butylamine, n-pentylamine, n-hexylamine, morpholine, and piperidine. Examples of "amidines" include benzamidine, and formamidine. Examples of "thiols" include a straight chain thiol having 1 to 6 carbon atoms. Specific examples of thiols include methanethiol, ethanethiol, 1-propanethiol, 1-butanethiol, 1-pentanethiol, and 1-hexanethiol. Examples of "thiol derivatives" include alcohols or ethers containing the straight chain alkylthio groups containing 1 to 6 carbon atoms wherein the straight chain alkylthio groups are identical to or different from each other. Specific examples of thiol derivatives include 2-mercaptoethanol, 4-mercapto-1-butanol, 6-mercapto-1-hexanol, mercaptomethyl ether, 2-mercaptoethyl ether, 3-mercaptopropyl ether, 4-mercaptobutyl ether, 5-mercaptopentyl ether, and 6-mercaptohexyl ether. As the capturing compound, nitromethane is more preferably used.

A compound represented by formula (2):

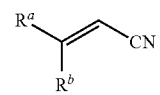

(2)

(wherein $R^a$ and $R^b$ are identical to or different from each other, and each represents a methyl group, an ethyl group, or a hydrogen atom, with the proviso that $R^a$ and $R^b$ do not represent a hydrogen atom at the same time.).

The used amount of the compound which captures the compound represented by formula (2) as a by-product can be within a range of 0.1 to 100.0 moles %, preferably 1.0 to 50.0 moles %, preferably 2.0 to 40.0% moles, and more preferably 3.0 to 30.0% moles, as opposed to the fluoride ion source which leaves a protecting group of hydroxy group represented by formula (1).

The reaction temperature at deprotecting a protecting group of hydroxy group represented by formula (1) may be varied depending on a kind of the deprotecting agent used, and is within a range of usually 0° C. to 80° C., preferably 10° C. to 45° C., and more preferably 15° C. to 35° C.

Further, the duration of the deprotection may be varied depending on a kind of the deprotecting agent used, or a reaction temperature, and is within a range of usually 1 to 100 hour(s), preferably 1 to 24 hour(s), more preferably 2 to 12 hours, more preferably 3 to 10 hours, more preferably 3 to 8 hours, and still more preferably 3 5 to 6 hours.

Here, the reaction temperature may be changed at any timing, and the deprotecting agent which deprotects a protecting group of hydroxy group represented by formula (1) may be added at any timing.

An atmosphere of an inert gas or inert gases containing 15% or less of the oxygen concentration may be adjusted by preparing the inert gas or inert gases containing the above prescribed concentration or less of oxygen concentration, followed by supplying the gas or gases to the reaction system, and measuring and confirming that the oxygen concentration in the gas phase is within the above prescribed concentration range. Specifically, the oxygen concentration can be adjusted by the following methods, and for example, a high purity of inert gas (such as argon or nitrogen) or inert gases, or an inert gas or inert gases having the oxygen concentration adjusted to the prescribed concentration, is flowed in a gas phase of the reaction system, or alternatively, the gas or gases atmosphere of the reaction system is substituted with the above inert gas or inert gases, or the inert gas or inert gases having the concentration adjusted.

Examples of the inert gas or inert gases used in the process of the present invention include nitrogen gas, argon gas, helium gas, carbon dioxide, which are not limited thereto. Nitrogen gas or argon gas is preferably included.

The substitution method for reaction system atmosphere may be a substitution under reduced pressure, a substitution under pressurized pressure, a flow substitution, a substitution using a bubbling, or a substitution using a freeze degassing, and an ultrasonic wave or a heat may be applied while these substitution methods are conducted. More preferable method include a flow substitution and a substitution under reduced pressure.

The oxygen concentration is preferably 15% or less, more preferably 10% or less, more preferably 5% or less, and still more preferably 0%.

Though a stirring procedure of the reaction system is not essential at the leaving reaction of the protecting group, the stirring is usually conducted within a range of 0.0 to 0.5 kW/m³ of a stirring power Pv, and the stirring with 0.1 to 0.3 kW/m³ of Pv is preferably included.

As the measures for separation and purification of the nucleic acid oligomer produced after the reaction from the reaction mixture, conventional methods can be adopted, and for example, using the measures such as extraction, concentration, neutralization, filtration, centrifugation, recrystallization, silicagel column chromatography, thin layer chromatography, reverse-phase column chromatography, ion exchange column chromatography, gel permeation column chromatography, hydrophobic interaction chromatography, hydrophilic interaction chromatography, precipitation (such as precipitation of nucleic acid oligomer using ethanol, isopropanol, methanol, or polyethylene glycol), dialysis, and ultrafiltration can deprotect a protection with a protecting group of hydroxy group at 2' position or 3' position represented by formula (1). The purified nucleic acid oligomer can be isolated. The isolated nucleic acid oligomer can be usually obtained as a nucleic acid oligomer having a hydroxy group at its 5' terminus protected.

The reaction in which a protecting group represented by formula (1) is deprotected from a nucleic acid oligomer represented by formula (3) to obtain a nucleic acid oligomer represented by the following formula (4) is described below (Scheme 1).

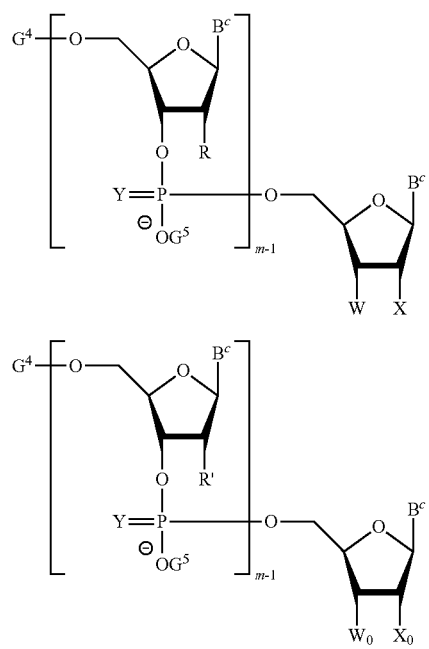

In the formula (3) or the formula (4), when R represents a OQ group, and R' represents a OQ' group, a structure of a ribose represents the following formula (LNA-1), (LNA-2) or (LNA-3).

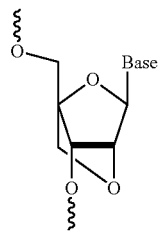

LNA-1

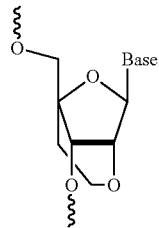

LNA-2

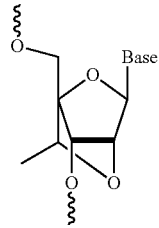

LNA-3

(wherein Base represents a nucleobase.).

As examples of the nucleoside (such as ribose, and deoxyribose) contained in the nucleic acid oligomer used in the present invention, DNA, RNA, 2'-O-MOE (2'-O-methoxyethyl), 2'-O-Me, 2'-F RNA, and the above LNA are exemplified, and the above nucleoside is not limited thereto.

The nucleic acid oligomer represented by formula (3) can be obtained, for example, by cutting out a nucleic acid oligomer represented by formula (5) which is prepared by a solid phase synthesis from a solid support, as shown in Scheme 2.

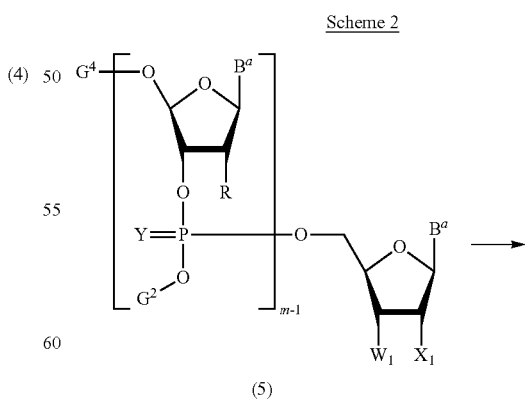

Scheme 2

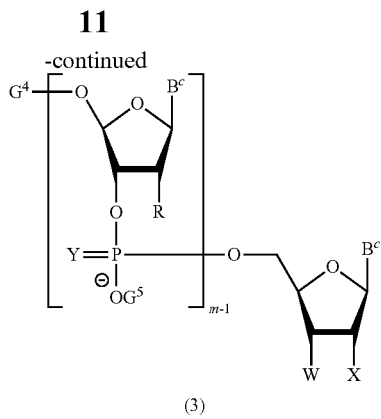

(3)

In the nucleic acid oligomer of formula (5) which is synthesized on a solid support,
in the formula,
the substituent group $B^a$ may be a nucleobase, each of which is independently identical to or different from each other,
$G^4$ and Y are the same as those defined in the above formula (3),
$G^2$ represents a protecting group of a phosphoric acid, each of which is independently identical to or different from to each other,
when $X_1$ represents OZ, $W_1$ represents OV group,
V represents a tert-butyldimethylsilyl group, or the above group represented by formula (1).
when $X_1$ represents a R group, $W_1$ represents a group represented by OZ.
Z represents a group consisting of a solid support, and a connection group connecting the solid support and the oxygen atom of a hydroxy group at 2' position or 3' position of a ribose at 3' terminus of the nucleic acid oligomer.
More specifically, Z represents a structure represented by the following formula (6):

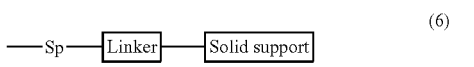

(6)

In formula (6), Sp represents a spacer.
The Spacer (Sp) is exemplified by a group having a structure represented by the following formula (7).

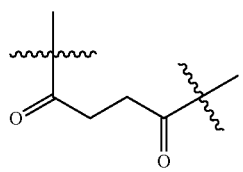

(7)

The Linker may be any structure represented by the following formula (8-1), (8-2), (8-3), (8-4), (8-5), (8-6), (8-7), or (8-8).
Examples of the solid support" include an inorganic porous support, and organic resin support, and the others. Examples of the inorganic porous support include Controller pore Glass (CPG) and zeolite. Examples of the organic porous support include a support composed of polystyrene.

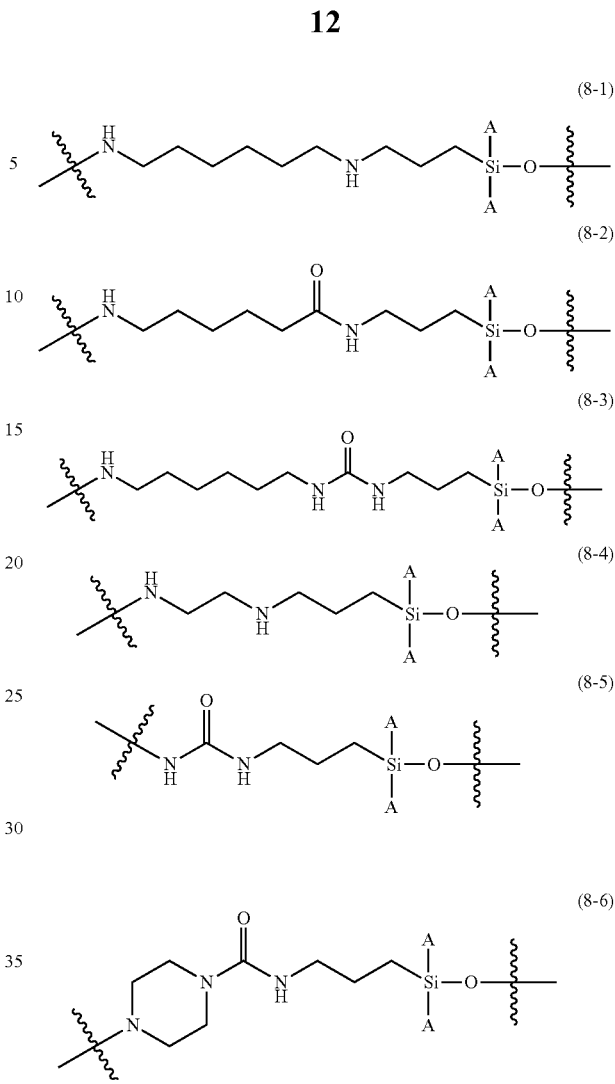

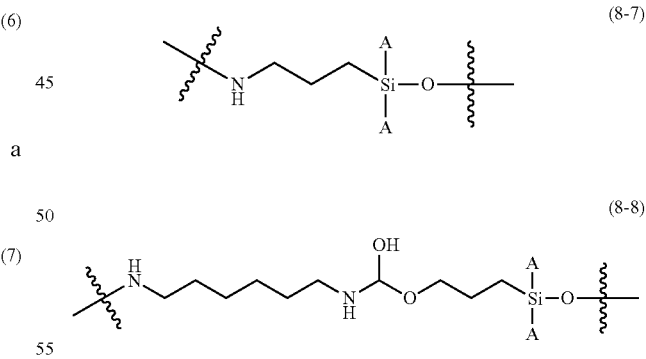

(wherein A may represent a hydroxy group, an alkoxy group, or an alkyl group. Examples of the alkoxy group include a methoxy group and an ethoxy group. Examples of the alkyl group include a methyl group, an ethyl group, an isopropyl group, and a n-propyl group. Si represents a binding to an oxygen atom of a hydroxy group in a support surface.)

The compound represented by the above formula (5) is prepared according to an amidite method by using an amidite compound represented by the following formula (A13).

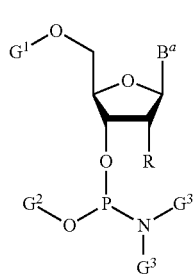

(A13)

(wherein
R represents a hydrogen atom, a fluorine atom, or OQ group,

Q represents a tert-butyldimethylsilyl group, a methyl group, a 2-methoxyethyl group, a methylene group which is bonded to a carbon atom at 4' position, an ethylene group which is bonded to a carbon atom at 4' position, an ethylidene group which is bonded to a carbon atom at 4' position, or a protecting group represented by the above formula (1).

$B^a$ represents a nucleobase which may be optionally protected, $G^1$ presents a protecting group of hydroxy group, $G^2$ represents a protecting group of a phosphoric acid, and $G^3$ represents an alkyl group, or a cyclic structure wherein both of $G^3$ may binds to each other at the respective terminus).

A nucleobase as $B^a$ group is not particularly limited. Examples of the nucleobase include adenine, cytosine, guanine, uracil, thymine, 5-methyl cytosine, pseudo uracil, 1-methyl pseudo uracil, and the others. Also the nucleic acid base may be optionally substituted with substituent(s). Examples of the substituent include a halogen atom (such as fluoro group, chloro group, bromo group, and iodo group), an acyl group (such as acetyl group), alkyl group (such as methyl group and ethyl group), arylalkyl group (such as benzyl group, alkoxy group (such as methoxy group), alkoxyalkyl group (such as methoxyethyl group), cyanoalkyl group (such as cyanoethyl group), hydroxy group, hydroxyalkyl group, acyloxymethyl group, amino group, monoalkylamino group, dialkylamino group, carboxy group, cyano group, and nitro group, as well as combinations of two or more of these substituents.

In the case where a nucleic acid base contains an exocyclic amino group, the protecting group of the amino group is not particularly limited, and the protecting group used in a publicly known nucleic acid chemistry field may be used, and examples of the protecting group include benzoyl group, 4-methoxybenzoyl group, acetyl group, propionyl group, butyryl group, isobutyryl group, phenylacetyl group, phenoxyacetyl group, 4-tert-butylphenoxyacetyl group, 4-isopropylphenoxyacetyl group, and (dimethylamino)methylene group, as well as combinations of two or more of these protecting groups.

$B^a$ represents more specifically any groups indicated below.

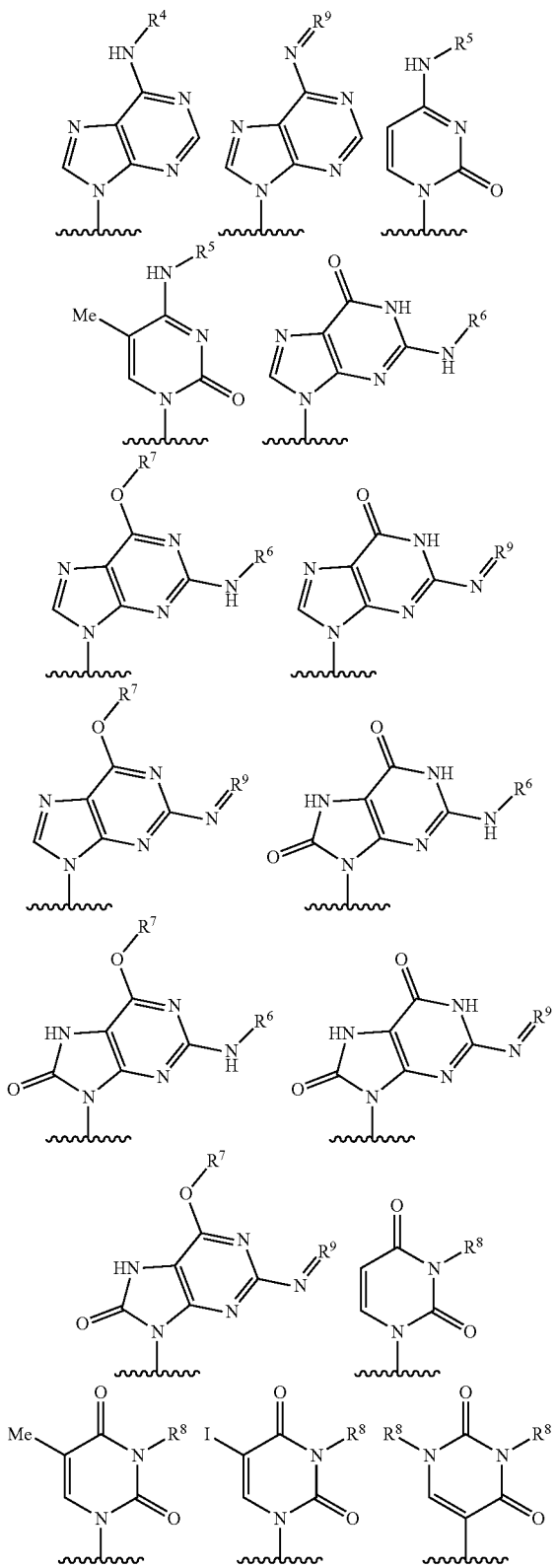

{wherein
$R^4$ represents a hydrogen atom, a methyl group, a phenoxyacetyl group, a 4-tert-butylphenoxyacetyl group, a 4-isopropylphenoxyacetyl group, a phenylacetyl group, an acetyl group, or a benzoyl group, R⁵ represents a hydrogen atom, an acetyl group, an isobutyryl group, or a benzoyl group, R⁶ represents a hydrogen atom, a phenoxyacetyl group, a 4-tert-butylphenoxyacetyl group, a 4-isoproylphenoxyacetyl group, a phenylacetyl group, an acetyl group or an isobutyryl group, R⁷ represents a 2-cyanoethyl group, R⁸ represents a hydrogen atom, a methyl group, a benzoyl group, a 4-methoxybenzoyl group, or a 4-methylbenzoyl group, and R⁹ represents a dimethylaminomethylene group.)

G¹ can be used without any particularly limitation as long as it can function as a protecting group, and a publicly known protecting group used for the amidite compound can be used widely.

G¹ represents preferably the following groups.

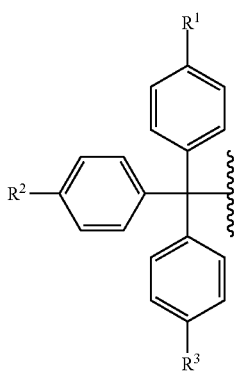

(wherein R¹, R² and R³ are identical to or different from each other, and each independently represents a hydrogen atom or an alkoxy group.)

One of R¹, R² and R³ represents a hydrogen atom, and the remaining two thereof are identical to or different from each other (preferably identical) and represents preferably an alkoxy group, and as an alkoxy group, a methoxy group is particularly preferred.

G² can be used without any particular limitation as long as it can function as a protecting group, and a publicly known protecting group for an amidite compound can be widely used. Examples of G² include an alkyl group, an alkenyl group, an alkynyl group, a cycloalkyl group, a haloalkyl group, an aryl group, a heteroaryl group, an arylalkyl group, a cycloalkenyl alkyl group, a cycloalkylalkyl group, a cyclylalkyl group, a hydroxyalkyl group, an aminoalkyl group, an alkoxyalkyl group, a heterocyclylalkenyl group, a heterocyclylalkyl group, a heteroarylalkyl group, a silyl group, a silyloxyalkyl group, a mono, di or tri-alkylsilyl group, a mono, di or tri-alkylsilyloxyalkyl group, and the others, and these groups may be optionally substituted with one or more electron-withdrawing group.

G² represents preferably an alkyl group substituted with electron-attracting group. Examples of the electron-withdrawing group include a cyano group, a nitro group, an alkylsulfonyl group, a halogen atom, an arylsulfonyl group, a trihalomethyl group, a trialkylamino group, and the others, and preferably a cyano group.

Particularly preferable example of G² include the following groups.

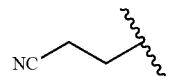 [SMILES: *CCC#N]

For G³, two G³ may be combined with each other to form a cyclic structure. Preferably, both G³ are an isopropyl group.

The alkyl group as the definitions of the above R¹, R², R³ and G² may be a straight chain or a branched chain, and preferably include an alkyl group containing 1 to 12 carbon atoms, and more preferably an alkyl group containing 1 to 6 carbon atoms. Specific examples of alkyl group include a methyl group, an ethyl group, a n-propyl group, an isopropyl group, a n-butyl group, an isobutyl group, a tert-butyl group, a n-pentyl group, an isopentyl group, and a hexyl group. An alkyl group part composed of the alkoxy group in the definition for above substituents has the same definition as that described in the definition of alkyl group described here.

G⁴ represents a hydrogen atom or a protecting group of hydroxy group, and when it represents a protecting group, it is the same as defined in G¹. When G⁴ is deprotected, it is a hydrogen atom, and the nucleotide compound in the case is also provided in a series of steps for nucleic acid elongation reaction.

G⁵ represents an ammonium ion, an alkyl ammonium ion, an alkali metal ion, a hydrogen atom, or a hydroxyalkyl ammonium ion. As alkyl ammonium ion, specific examples of alkyl groups include methyl, ethyl, n-propyl, isopropyl, n-butyl, isobutyl, tert-butyl, n-pentyl, isopentyl, and hexyl, and specific examples thereof include diethyl ammonium ion, triethyl ammonium ion, tetrabutyl ammonium ion, hexyl ammonium ion, and dibutyl ammonium ion, and the others. Examples of alkali metal ion include sodium ion and lithium ion. Also as hydroxy alkyl ammonium ion, specific examples of hydroxyalkyl part thereof include hydroxymethyl, hydroxyethyl, hydroxy-n-propyl, hydroxy isopropyl, hydroxy-n-butyl, and tris hydroxy methyl, and more specific examples of hydroxyalkyl ammonium ion include tris hydroxymethyl ammonium ion and the others.

As used herein, a nucleobase represents a group having a natural type or a non-natural type of nucleobase backbone. The above nucleobase encompasses also modified forms having the natural type or the non-natural type of nucleobase backbone modified. As a nucleobase represented by B^c, specific examples of the nucleobase are exemplified by the following structures.

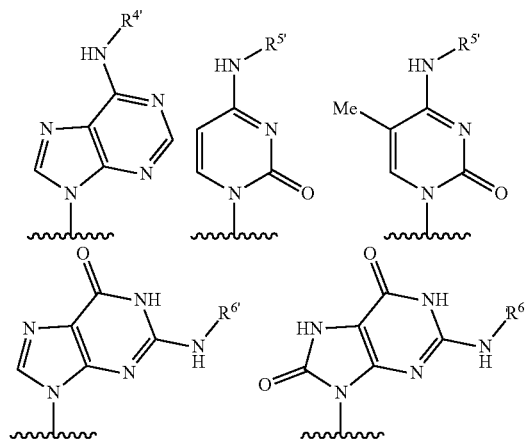

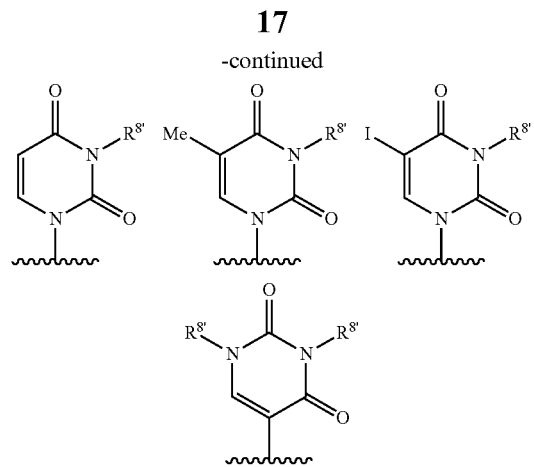

(wherein

R⁴' represents a hydrogen atom, or a methyl group,

R⁵' represents a hydrogen atom, or an acetyl group,

R⁶' represents a hydrogen atom,

R⁸' represents a hydrogen atom, or a methyl group.)

$B^a$ represents a nucleobase represented by $B^c$, or a nucleobase wherein the nucleobase is protected with a protecting group.

A process for preparing a nucleoside comprising a ribose wherein a hydroxy group is protected with a protecting group represented by formula (1), or its amidite compound is described below.

The amidite compound wherein a hydroxy group at 2' position of a ribose is protected with a protecting group can be prepared according to the below-mentioned schemes 3 and 4 which are described in WO 2019/208571 A1, JP 2018-083148 A1 and PCT/JP2019/017249.

Scheme 3

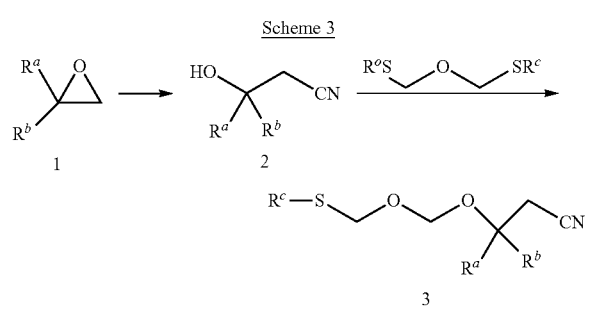

Scheme 4

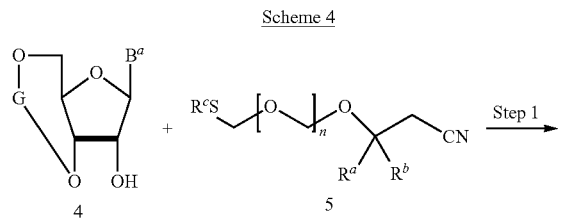

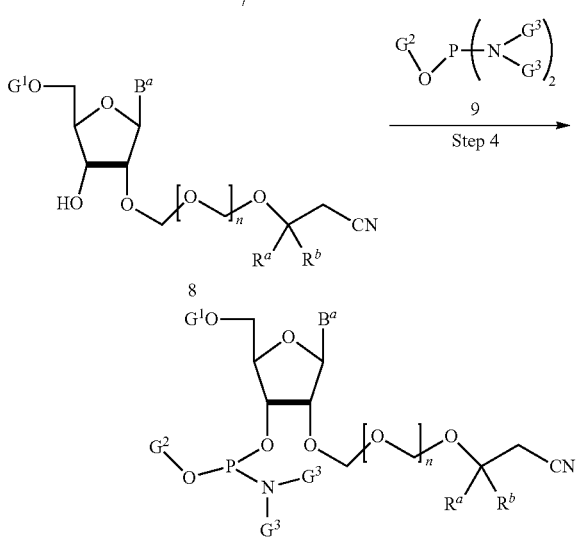

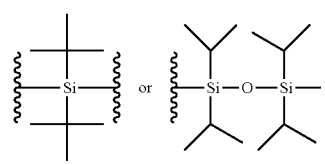

(wherein $R^a$ and $R^b$ are identical to or different from each other, and each represents a methyl group, an ethyl group or a hydrogen atom, with the proviso that $R^a$ and $R^b$ do not represent a hydrogen atom at the same time;

$R^c$ represents a methyl group or an ethyl group;

$B^a$ represents a nucleobase which may be optionally protected, n is an integer of 1 to 5, G represents a protecting group of hydroxy group indicated in the formula, $G^1$ and $G^2$ are identical to or different from each other, and each independently represents a protecting group of hydroxy group, and $G^3$ is identical to or different from each other and each represents an alkyl group.)

The above schemes 3 and 4 are summarized.

First, as shown in the scheme 3, the compound 1 is reacted with a cyanide ion to obtain a 3-hydroxyalkyl nitrile compound 2. Then the compound 2 is reacted with bis(alkylthiomethyl)ether to obtain an ether compound 3.

Next, as shown in the scheme 4, the compound 4 is reacted with the compound 5 (prepared according to the method described in the scheme 3) in the presence of an oxidizing agent to obtain a compound 6 (wherein the hydroxy group at 2' position of ribose is protected with a protecting group represented by formula (1)). Then the compound 6 is deprotected to obtain a compound 7. A hydroxy group of the compound 7 is protected selectively with a protecting group $G^1$ to obtain a compound 8. Also, the compound 8 is reacted with a phosphorodiamidite compound 9 to obtain a desirable amidite compound 10.

Scheme 3

In the reaction of the scheme 3,
as the cyanide ion, for example, cyanide ion which is derived from sodium cyanide, potassium cyanide, copper cyanide, trimethylsilyl cyanide and the others can be used.
When trimethylsilyl cyanide is used, a base may be added preferably.
Examples of the base to be used in this reaction include alkali metal hydroxides, alkaline earth metal hydroxides, and ammonium hydroxide, as well as combinations of two or more of these bases. In the present invention, lithium hydroxide and lithium hydroxide monohydrate are preferably used. The amount of the base is within a range of usually 0.01 to 1 equivalent(s), and preferably 0.1 to 0.3 equivalents, as opposed to 1 equivalent of the epoxy compound 1.

The amount of the cyanide ion is within a range of usually 0.3 to 2 equivalents, and preferably 0.6 to 0.8 equivalents, as opposed to 1 equivalent of the compound 1.

When "equivalent" is referred to as herein, it represents "molar equivalent" unless otherwise indicated.

The reaction temperature of this reaction is within a range of usually −20 to 40° C., and preferably 0 to 35° C. The reaction duration of this reaction is within a range of usually 0.5 to 24 hours, and preferably 1 to 5 hour(s).

The ether compound 3 can be prepared, for example, by reacting bis(alkylthiomethyl)ether or bis(phenylthiomethyl) ether with 3-hydroxy-3-alkylpropane nitrile in the presence of an oxidizing agent and an acid in a solvent.

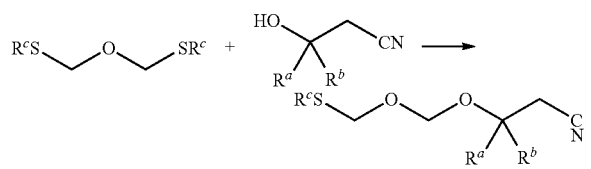

A bis(alkylthiomethyl)ether or bis(phenylthiomethyl)ether can be obtained by reacting bischloromethyl ether or bis(aryloxymethyl)ether with the corresponding alkylmecaptan or phenylmercaptan. Examples of the bis(aryloxymethyl)ether include bis(2,4,6-trichlorophenyloxymethyl)ether.

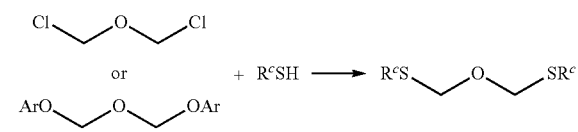

Also the intended compound can also be prepared according to a method described in the below-mentioned working examples or methods with appropriate changes to these methods as needed.

Examples of the oxidizing agent include N-halogenated succinimides (such as N-chlorosuccinimide, N-bromosuccinimide, and N-iodosuccinimide), N-halogenated hydantoins (such as 1,3-diiodo-5,5-dimethyl hydantoin), halogenes (such as chlorine, bromine, and iodine) as well as combinations of two or more of these compounds. In the present invention, N-halogenated succinimide is preferably used, and N-iodosuccinimide is more preferably used.

In this reaction, in addition to an oxidizing agent, an acid may be used, and the acid is not particularly limited, and examples of the acid include perfluoroalkyl carboxylic acids and salts thereof, perfluoroalkyl sulfonic acids and salts thereof, as well as combinations of two or more of these. Examples of the salts include copper salt and silver salt. Specific examples of acids include methane sulfonic acid, paratoluene sulfonic acid, camphor sulfonic acid, trifluoromethane sulfonic acid, silver trifluoromethane sulfonate, and the others, as well as combinations of two or more of these compounds. In the present invention, trifluoromethane sulfonic acid is preferably used.

Examples of solvent include tetrahydrofuran, 2-methyltetrahydrofuran, cyclopentyl methyl ether, dioxane, dichoromethane, and toluene, as well as combinations of two or more of these solvents. In the present invention, tetrahydrofuran is preferably used.

The amount of 3-hydroxyalkylnitrile is within a range of usually 0.5 to 2 equivalents, and preferably 0.8 to 1.5 equivalents, as opposed to bis(alkylthiomethyl)ether or bis (phenylthiomethyl)ether. The amount of the oxidizing agent is within a range of usually 0.5 to 2 equivalents, and preferably 0.7 to 1.2 equivalents, as opposed to bis(alkylthiomethyl)ether or bis(phenylthiomethyl)ether. The amount of the acid is within a range of usually 0.001 to 2.0 equivalents, and preferably 0.01 to 0.1 equivalents, as opposed to bis(alkylthioethyl)ether or bis(phenylthiomethyl)ether.

The reaction temperature of this reaction is within a range of usually −80 to 0° C., and preferably −50 to −30° C. The reaction duration of this reaction is within a range of usually 1 to 24 hour(s), and preferably 2 to 6 hours.

After the completion of the reaction, a part of the reaction mass is sampled, and can be confirmed by an analysis method such as GC, TLC, LC and the others. After the completion of the reaction, a base such as triethylamine may be added to quench the reaction. The reaction mass is injected to water, and the resulting mixture can be subjected to usual worked up procedures (such as extraction with organic solvent, washing, and concentration) to obtain the residues containing the ether compound 6. The residues are subjected to a purification procedures (such as distillation, and column chromatography) to obtain the high purity of ether compound 3.

Scheme 4

In the reaction of the scheme 4,
Step 1 (Etherification Step)
The step of preparing the compound 6 can be conducted by reacting the compound 4 with the compound 5. This reaction is usually conducted by adding an oxidizing agent. The oxidizing agent to be used in this step is not particularly limited, but is preferably at least one compound selected from the group consisting of N-chlorosuccinimide, N-bromosuccinimide, N-iodosuccinimide, iodine, 1,3-diiodo-5,5'-dimethyl hydantoin, bromine, and chlorine.

In this step, an acid may be added, and the acid used is not particularly limited, but is preferably at least one compound selected from the group consisting of perfluoroalkyl carboxylic acid, perfluoroalkyl sulfonic acid, alkyl sulfonic acid, and salts thereof.

The reaction solvent to be used in this step is not limited, and include, for example, ethers (such as diethyl ether, THF (tetrahydrofuran), 2-methyltetrahydrofuran, tetrahydropyran, 4-methyltetrahydropyran, dimethoxyethane, diglyme, cyclopentyl methyl ether, and dioxane), nitriles (such as acetonitrile), aromatic hydrocarbons (such as toluene, chlorobenzene, and dichlorobenzene), dichloromethane, and the others, as well as combinations of two or more of these solvents. Preferred examples of the solvents include ethers such as diethyl ether, THF (tetrahydrofuran), 2-methyltetrahydrofuran, tetrahydropyran, 4-methyltetrahydropyran, dimethoxy ethane, diglyme, cyclopentyl methyl ether, and dioxane. More preferred examples of the solvents include tetrahydropyran and 4-methyltetrahydropyran.

The reaction duration in this step is not particularly limited, but is within a range of, for example, 10 minutes to 12 hours, and preferably 10 minutes to 6 hours.

The reaction temperature in this step is not particularly limited, but is within a range of, for example, −80 to 30° C., and preferably −60 to 10° C.

In this step, the concentration of the above ether compound 5 is not particularly limited, and may be set to an appropriate one as needed.

In this step, the number of moles of the ether compound 5 is within a range of, for example, 0.5 to 2 times, and preferably 0.8 to 1.5 times, as opposed to the number of moles of the compound 4.

In this step, the number of moles of the above oxidizing agent is within a range of, for example, 0.5 to 10 times, and preferably 0.8 to 6 times, as opposed to the number of moles of the compound 4.

Step 2 (Deprotection Step)

The compound 6 which is obtained in the above step 1 is subjected to a deprotection reaction to convert into the compound 7. The deprotection step can be conducted according to a publicly known method, and can be typically conducted by acting with hydrogen fluoride/triethylamine or hydrogen fluoride/pyridine to deprotect.

Step 3 (Protection Step of 5' Hydroxy Group)

The compound 7 which is obtained in the above step is supplied to a protection step, and an introduction of a protecting group can be conducted according to a publicly known method, and is conducted typically by reacting the compound 7 with 4,4'-dimethoxytrityl chloride in pyridine to introduce a protecting group, so as to obtain the compound 8.

Step 4 (Amiditation Step)

This step is conducted by reacting the compound 8 which is obtained in the above step with the compound 9. Typically, 2-cyano-N, N, N', N'-tetraisopropyl phosphorodiamidite as the compound 9 is reacted in the presence of diisopropylammonium tetrazolide to prepare an amidite compound 10. The amiditation can be conducted according to the method described in working examples 2 to 5 described in JP 5554881 B2.

A non-nucleotide linker, which may be incorporated instead of the number of p (with the proviso that p is a positive integer satisfying an equation: m−1>p) of nucleotides between the nucleotides at 5' terminus and 3' terminus, is described.

As non-nucleotide linker, a linker composed of amino acid backbone (for example, a linker composed of amino acid backbone as described in JP 5157168 B2 or JP 5554881 B2) is exemplified. Specifically, as a non-limiting example, a linker represented by formula (A14-1), (A14-2) or (A14-3) is exemplified. In addition to these linkers, a particular linker as described in WO 2012/005368 A1, WO 2018/182008 or WO 2019/074110 is exemplified.

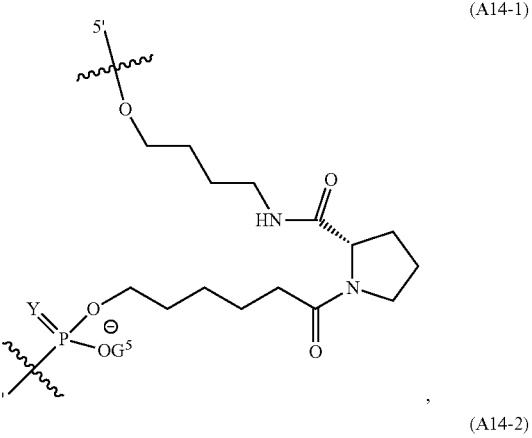

(A14-1)

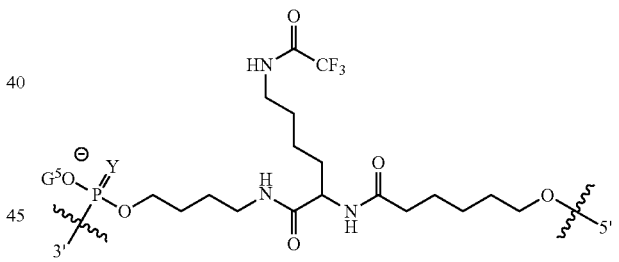

(A14-2)

(A14-3)

A nucleotide and an amidite wherein a R group in formula (3) and a R' group in formula (4) are substituents other than a hydroxyl group, can also be prepared from nucleosides which are synthesized according to publicly known methods described in JP 3745226 B2 and on the others, or WO 2001/053528 A1, JP 2014-221817 A or publicly known methods referred to in these documents. Further, they can prepared by using a commercially available compound in line with the method described in the below Examples or methods with appropriate modifications to these methods.

Cutting Off of Nucleic Acid Oligomer (Hereinafter, Referred to as "Oligonucleotide") from a Solid Support The cutting off step was conducted by using concentrated aqueous ammonia water as a cutting off agent on a nucleic acid oligomer having a desirable chain length.

In a phosphoramidite method, an elongation reaction of nucleic acid is conducted by repeating each step such as a deprotection step, a condensation step and an oxidation step according to a generally known method (for example, the method described in the above JP 5157168 B2 or JP 5554881 B2).

(Nucleic Acid Elongation Reaction)

As used herein, "nucleic acid elongation reaction" means that a reaction for elongating oligonucleotide by attaching nucleotide sequentially through phosphodiester bond. The nucleic acid elongation reaction can be carried out according to the procedures of general phosphoramidite method. The nucleic acid elongation reaction may be carried out with a nucleic acid automatic synthesizer and the others which applies a phosphoramidite method.

The chain length of a nucleic acid oligomer may be, for example, 2 to 200 mer, and 10 to 150 mer, and 15 to 110 mer.

A 5' deprotection step is a step where a protecting group of a 5' hydroxyl group at RNA chain terminus which is supported on the solid support. As a general protecting group, 4,4'-dimethoxytrityl group (DMTr group), 4-monomethoxytrityl group, and 4,4',4''-trimethoxytrityl group are used. A deprotection reaction can be carried out by using an acid. Examples of the acid for deprotection reaction include trifluoroacetic acid, dichloroacetic acid, trifluoroethanesulfonic acid, trichloroacetic acid, methanesulfonic acid, hydrochloric acid, acetic acid, p-toluenesulfonic acid, and the others.

The condensation step is a reaction where a nucleoside phosphoramidite represented by the following formula (A13) is attached to a 5' hydroxyl group at oligonucleotide chain terminus deprotected by the above deprotection step. As the phosphoramidite to be used in the nucleic acid elongation, an amidite compound represented by formula (A13) or (A12) is used. Also, as another available phosphoramidite, 2'-OMe, 2'-F, 2'-O-tert-butyldimethylsilyl group, 2'-O-methoxyethyl group, 2'-H, 2'-fluro-2'-deoxy-β-D-arabinofuranosyl and the others are included. As the above nucleoside phosphoramidite, those where 5' hydroxyl group is protected with a protecting group (for example, DMTr group) are used. The condensation step can be carried out by using an activator which activates the above-mentioned nucleotide phosphoramidite. Examples of the activator include 5-benzylthio-1H-tetrazole (BTT), 1H-tetrazole, 4,5-dicyanoimidazole (DCI), 5-ethylthio-1H-tetrazole (ETT), N-methyl benzimidazoliumtriflate (N-MeBIT), benzimidazoliumtriflate (BIT), N-phenylimidazoliumtriflate (N-PhIMT), imidazoliumtriflate (IMT), 5-nitrobenzimidazoliumtriflate (NBT), 1-hydroxybenzotriazole (HOBT), and 5-(bis-3,5-trifluoromethylphenyl)-1H-tetrazole, and the others.

After the condensation step, as needed, the unreacted 5' hydroxyl group may be capped. The capping reaction can be carried out by using publicly known capping solution such as acetic anhydride-tetrahydrofuran solution, and phenoxy acetic anhydride/N-methyl imidazole solution.

The oxidation step is a step for converting a phosphite group which is formed by the above condensation step into a phosphate group or a thiophosphate group. This step is a reaction of converting a trivalent phosphorus into pentavalent phosphorus using an oxidizing agent, which can be carried out by reacting an oxidizing agent with oligonucleic acid derivatives supported on a solid support.

When a phosphite group is converted into a phosphate group, as "oxidizing agent", for example, an iodine, a peracid such as tert-butyl hydroperoxide and hydrogen peroxide, or (10-camphor sulfonyl) oxazolidine (CSO) can be used. The oxidizing agent can be used by diluting it with an appropriate solvent so as to adjust to 0.001 to 2 M. The solvents are not particularly limited as long as they do not disturb the reaction, and include pyridine, THF, water, acetonitrile, 1-methylimidazole (NMI), or any mixed solvents of two or more of these solvents. For example, iodine/water/pyridine/acetonitrile, or iodine/water/pyridine, iodine/water/pyridine/acetonitrile/NMI, iodine/water/pyridine/THF, or iodine/water/pyridine/THF/NMI, or CSO/acetonitrile, or iodine/pyridine-acetic acid or peracid (tert-butyl hydroperoxide/methylene chloride) can be used.

When a phosphite group is converted into a thiophosphate group, as "oxidizing agent", for example, a sulfur, 3H-1,2-benzodithiol-3-one-1,1-dioxide (Beaucage reagent), 3-amino-1,2,4-dithiazole-5-thione (ADTT), 5-phenyl-3H-1,2,4-dithiazole-3-one (POS), [(N,N-dimethylaminomethylidene)amino]-3H-1,2,4-dithiazoline-3-thione (DDTT), and phenylacetyldisulfide (PADS) can be also used. The oxidizing agent can be used by diluting it with an appropriate solvent so as to adjust to 0.01 to 2 M. The solvents to be used are not particularly limited as long as they do not involve the reaction, and include, for example, dichloromethane, acetonitrile, pyridine, or any mixed solvents of these solvents. The oxidation step may be carried out after the above mentioned capping procedure, or vice versa, the capping procedure may be carried after the oxidation step, and the order of the procedures are not limited.

In the step of deprotecting a protecting group of a phosphorus group, when a synthesis of a nucleic acid having a desirable sequence is completed, an amine compound is reacted to deprotect a protecting group of a phosphorus part. Examples of the amine compound include, for example, diethylamine and the others as described in JP 4705716 B2.

The protecting group of 5' hydroxyl group of a nucleoside incorporated in the last stage of an elongation may be used for a column purification with 5' protecting group as a tag after the below-mentioned procedures of a cutting out from a solid support and a deprotection of a protecting group, or alternatively, the protecting group of 5' hydroxyl group may be deprotected after the column purification.

Further, using aqueous ammonia or amine compound or the others, for example, an oligo nucleotide chain is recovered by cutting it out from a solid support as shown in the above Scheme 2. Examples of the amine compound include methylamine, ethylamine, isopropylamine, ethylenediamine, diethylamine, and the others.

Examples of the nucleic acid oligomer which can be prepared according to the process of the present invention include those wherein a nucleoside contained in the nucleic acid oligomer is a RNA, a DNA, a RNA of 2'-O-MOE, 2'-O-Me, or 2'-F, and a LNA, which is not limited thereto.

For example, various nucleosides described in Xiulong, Shen et al., Nucleic Acids Research, 2018, Vol. 46, No. 46, 1584-1600, and Daniel O'Reilly et al., Nucleic Acids Research, 2019, Vol. 47, No. 2, 546-558 are included.

Examples of the nucleic acid oligomer which can be prepared according to the process of the present invention include those wherein a nucleoside contained in the nucleic acid oligomer is RNA, DNA, as well as RNA having 2'-O-MOE, 2'-O-Me, 2'-F, and LNA, which is not limited thereto.

For example, various nucleosides described in Xiulong, Shen et al., Nucleic Acids Research, 2018, Vol. 46, No. 46, 1584-1600, and Daniel O'Reilly et al., Nucleic Acids Research, 2019, Vol. 47, No. 2, 546-558 are included.

As typical examples of nucleic acid oligomer which can be used in the process of the present invention, the following examples are indicated in addition to examples described in working examples, which are not limited thereto.

Hereinafter, in a description of a sequence, U is uridine, C is cytidine, A is adenosine, or G is guanosine.

A nucleic acid oligomer having the following sequences (B) and (C) as described in WO 2019/060442 is exemplified.

```
Sequence (B):
(Antisense) 21 mer
                                        (Sequence No. 3)
5'-AUGGAAUmACUCUUGGUUmACdTdT-3'

Sequence (C):
(Sense) 21 mer
                                        (Sequence No. 4)
5'-GUmAACmCmAAGAGUmAUmUmCmCmAUmdTdT-3'
```

In the sequence (B) and sequence (C), Um is 2'-O-metyluridine, Cm is 2'-O-methylcytidine, or dT is thymidine.

A nucleic acid oligomer as described in Daniel O'Reilly et al., Nucleic Acids Research, 2019, Vol. 47, No. 2, 546-558 (refer to p. 553) is exemplified. Typical examples thereof include a nucleic acid oligomer having the following sequence (D).

```
Sequence (D):
36 mer
                                        (Sequence No. 5)
5'-AGAGCCAGCCUUCUUAUUGUUUUAGAGCUAUGCUGU-3'
```

A nucleic acid oligomer as described in JP 4965745 B2 is exemplified. Typical examples thereof include a nucleic acid oligomer having the following sequence (E).

```
Sequence (E):
49 mer
5'-CCAUGAGAAGUAUGACAACAGCC-P-

GGCUGUUGUCAUACUUCUCAUGGUU-3'.

(Sequence No. 6)
CCAUGAGAAGUAUGACAACAGCC, (Sequence No. 7)
GGCUGUUGUCAUACUUCUCAUGGUU.
```

In the Sequence (E), "P" is depicted by a partial structure separated by wavy lines in the following formula (A5).

A nucleic acid oligomer having the following sequence (F) as described in Nucleic Acids Research, 2019, Vol. 47, No. 2: 547 is exemplified.

```
Sequence (F):
67 mer
                                        (Sequence No. 8)
5'-ACAGCAUAGCAAGUUAAAAUAAGGCUAGUCCGUUAUCAACUUGAAAA

AGUGGCACCGAGUCGGUGCU-3'
```

A nucleic acid oligomer having the following sequence (G) as described in JP 2015-523856, 173 is exemplified.

```
Sequence (G):
94 mer
                                        (Sequence No. 9)
5'-GUUUUCCCUUUUCAAAGAAAUCUCCUGGGCACCUAUCUUCUUAGGUG

CCCUCCCUUGUUUAAACCUGACCAGUUAACCGGCUGGUUAGGUUUUU-3'
```

A nucleic acid oligomer as described in JP 2017-537626 is exemplified. Typical examples thereof include a nucleic acid oligomer having the following sequences (F), (G), (H), and (J).

```
Sequence (F):
100 mer
                                        (Sequence No. 10)
5'-AGUCCUCAUCUCCCUCAAGCGUUUUAGAGCUAGUAAUAGCAAGUUAA

AAUAAGGCUAGUCCGUUAUCAACUUGAAAAAGUGGCACCGAGUCGGUGCU

UUU-3'

Sequence (G):
113 mer
                                        (Sequence No. 11)
5'-GCAGAUGUAGUGUUUCCACAGUUUAAGAGCUAUGCUGGAAACAGCAU

AGCAAGUUUAAAUAAGGCUAGUCCGUUAUCAACUUGAAAAAGUGGCACCG

AGUCGGUGCUUUUUUU-3'

Sequence (H):
113 mer
                                        (Sequence No. 12)
5'-dAdGdTdCdCdTdCdAdTdCdTdCdCdCdTdCdAdAdGdCGUUUAAG

AGCUAUGCUGGUAACAGCAUAGCAAGUUUAAAUAAGGCUAGUCCGUUAUC

AACUUGAAAAAGUGGCACCGAGUCGGUGCUUUUUUU-3'
```

In the sequence (H), dT is thymidine, dC is 2'-deoxycytidine, dA is 2'-deoxyadenosine, or dG is 2'-deoxyguanosine.

```
Sequence (J):
113 mer
                                        (Sequence 13)
5'-AmsGmsUmsCCUCAUCUCCCUCAAGCGUUUAAGAGCUAUGCUGGUAA

CAGCAUAGCAAGUUUAAAUAAGGCUAGUCCGUUAUCAACUUGAAAAAGUG

GCACCGAGUCGGUGCUUUUmsUmsUmsU-3'
```

In the Sequence (J), Um is 2'-O-methyluridine, Am is 2'-O-methyladenosine, Gm is 2'-O-methylguanosine, or s is phosphorothioate modification.

EXAMPLES

Hereinafter, the resent invention is explained in more detail by working examples, and the present invention is not limited to these examples.

Measurement Method

Various measurement methods used in the following tests are shown below.

(Measurement Method 1: Measurement of Oligonucleotide Purity)

The measurement of purity of the oligonucleotide crude product after a solid phase synthesis was conducted by HPLC. The crude product was separated into each components by HPLC (wavelength 260 nm, column ACQUITY UPLC Oligonucleotide BEH C18, 2.1 mm×100 mm, 1.7 μm), and the purity of the oligonucleotide was calculated from the area value of major product as opposed to total area value of obtained chromatogram.

A HPLC measurement condition is shown in Table 1 below.

TABLE 1

| Column | ACQUITY UPLC Oligonucleotide BEH C18, 2.1 mm × 100 mm, 1.7 µm |
|---|---|
| Flow rate | 0.2 mL/min |
| Detection wavelength | 260 nm |
| Mobile phase A | 100 mM aqueous hexylamine acetate (pH = 7.0) |
| Mobile phase B | 100 mM aqueous hexylamine acetate:acetonitrile = 1:4 (v) |
| Gradient condition | B conc. 43% (0 min) -56% (70 min) -90% (70.01 min) -90% (75 min) -43% (75.01 min) -43% (90 min) |
| Column temperature | 80° C. |

(Measurement Method 2: Measurement of Oligonucleotide Yield)

$OD_{260}$ of the above crude product was measured. $OD_{260}$ represents an absorbance at UV260 nm per 10 mm optical path length in a 1 mL solution (pH=7.5). Since it is generally known that 1 OD=40 µg for RNA, the yield was calculated based on the above measured value of $OD_{260}$. Further, the yield of the products per unit volume of solid support was calculated. For the Examples 1 to 5 and Comparative Examples 1 and 2, each relative yield as opposed to the yield of Example 1 was calculated.

(Measurement Method 3: Measurement of Oxygen Concentration)

The oxygen concentration of atmosphere (air phase) in the reaction system was measured by PACK KEEPER (Residual Oxygen Meter) (manufactured by IIJIMA ELECTRONICS CORP.). Before the measurement of oxygen concentration, the device was calibrated by measurement of oxygen concentration in air or pure nitrogen, and a needle attached to the device was then inserted into a container such as a flask covered with a septum or the like, and the oxygen concentration of air phase in reaction system was measured. The measured value of the oxygen concentration was displayed in real time, and the oxygen concentration at the time point at which the measured value was stable was made the oxygen concentration of the atmosphere.

Solid Phase Synthesis of Oligonucleotide

```
Sequence (I):
53 mer
                            (Sequence Nos. 1 and 2)
5'-AGCAGAGUACACACAGCAUAUACC-P-

GGUAUAUGCUGUGUGUACUCUGCUUC-P-G-3'
```

In the above sequence (I), "A" is represented by a partial structure separated by wavy lines in the following formula (A1). "C" is represented by a partial structure separated by wavy lines in the following formula (A2). "G" is represented by a partial structure separated by wavy lines in the following formula (A3). "U" is represented by a partial structure separated by wavy lines in the following formula (A4). "P" is represented by a partial structure separated by wavy lines in the following formula (A5). Here "A" at a 5' terminus is represented by a partial structure separated by wavy lines in the following formula (A6). Also "G" at a 3' terminus is represented by a partial structure separated by wavy lines in the following formula (A7). Here the phosphoric acid in a structural formula may be its salt.

(Sequence No. 1)
AGCAGAGUAC ACACAGCAUA UACC (Sequence No. 2)
GGUAUAUGCU GUGUGUACUC UGCUUC

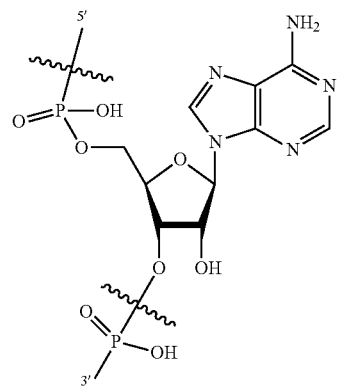

(A1)

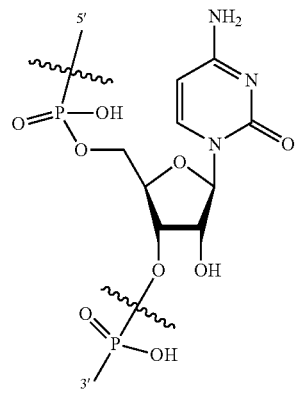

(A2)

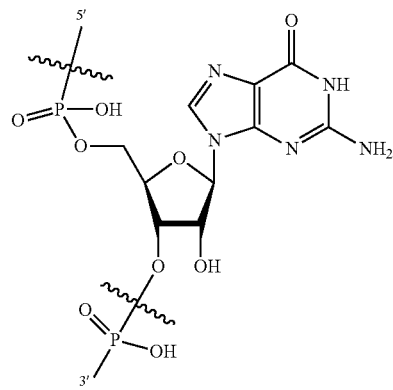

(A3)

-continued

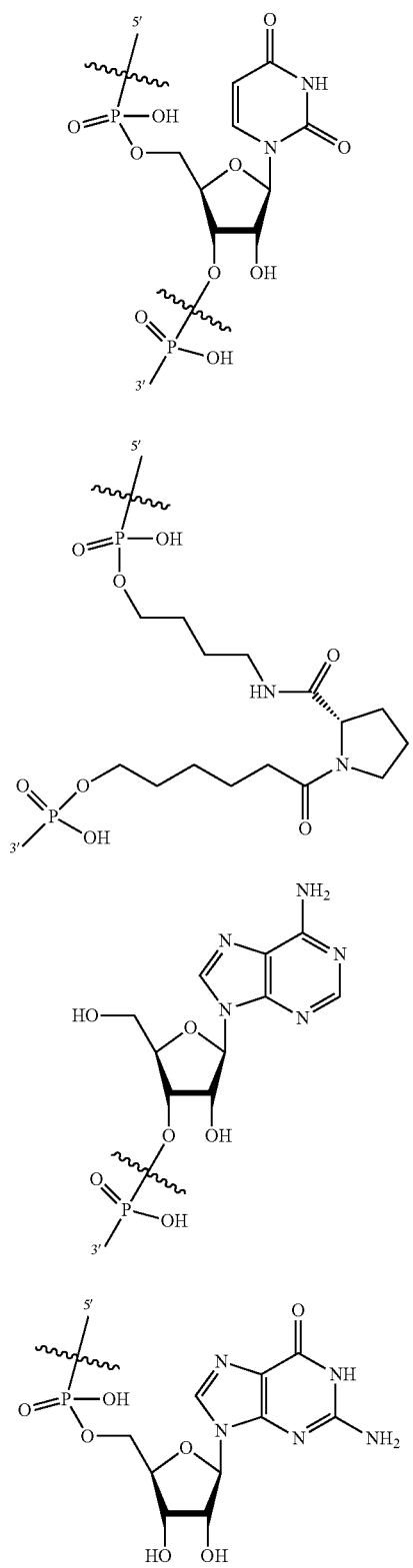

(A4)

(A5)

(A6)

(A7)

thesized from the 3' side to the 5' side. The synthesis was carried out on a scale of 78.20 μmol scale. Also in the synthesis, an adenosine PMM amidite (Compound (A8)), a cytidine PMM amidite (Compound (A9)), a guanosine PMM amidite (Compound (A10)), and a uridine PMM amidite (Compound (A11)), which are described in JP 2018-083148, and the compound (A12) as described in WO 2017/188042 were used, and a high-purity solution of trichloro acetic acid in toluene was used as a deblocking solution, and 5-benzylmercapto-1H-tetrazole was used as a condensation agent, and iodine solution was used as an oxidizing agent, and a phenoxy acetic anhydride solution and a N-methyl imidazole solution were used as a capping solution. After a completion of a nucleic acid elongation, a diethylamine solution was reacted to a nucleic acid on a support so as to deprotect selectively a cyanoethyl protecting group in a phosphoric acid part. Herein, PMM is an abbreviation of ((1-cyanopropan-2-yl)oxy)methoxy)methyl group.

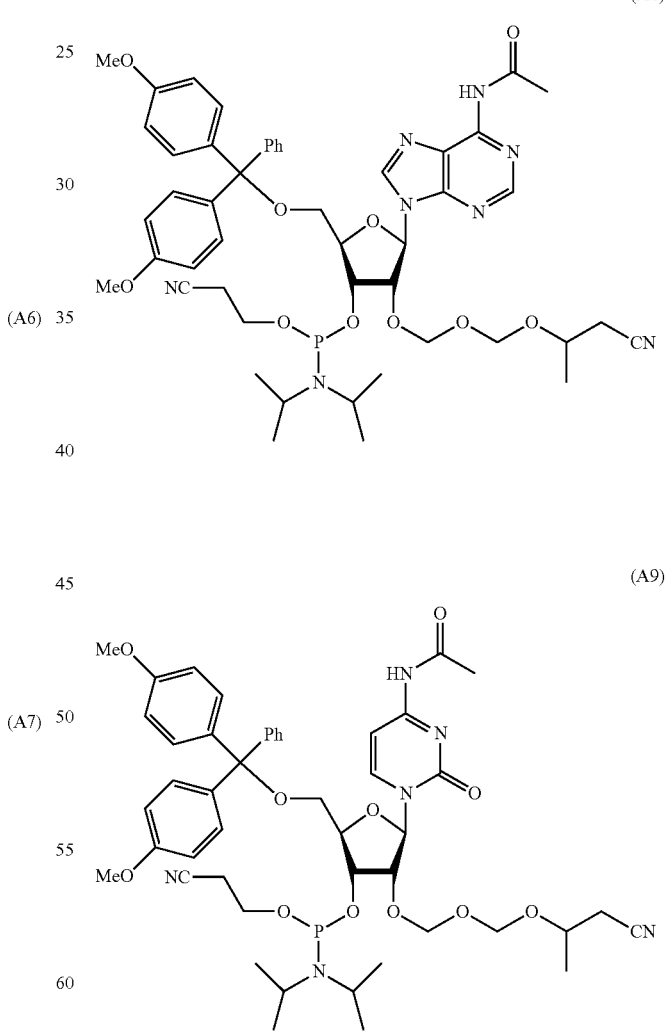

(A8)

(A9)

Using a Controlled Pore Glass (CPG) as a solid support and an AKTA oligonucleotide plus 100 (manufactured by GE healthcare) as a nucleic acid synthesizer, according to a phosphoramidite solid phase synthesis method, an oligonucleotide composed by the above sequence (I) was syn- (A10)
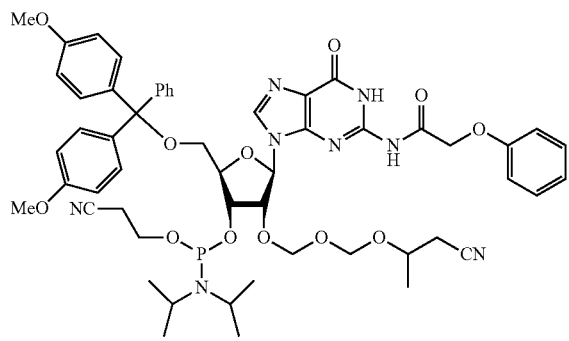

(A12)
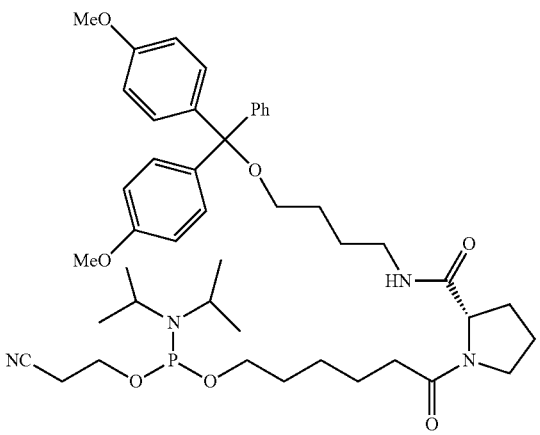

(A11)
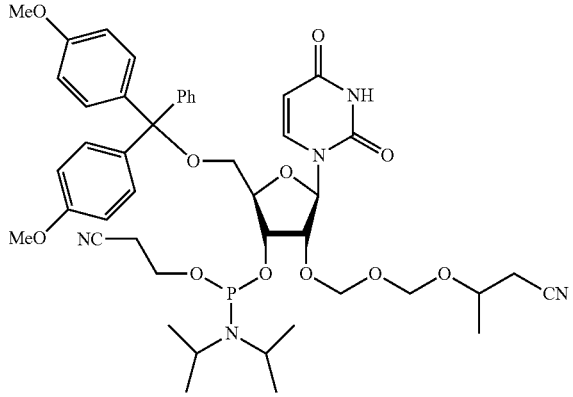

Next, specific preparation examples of oligonucleotide (nucleic acid oligomer) prepared according to the process of the present invention are shown. Here, in the following examples, the oligonucleotides prepared according to the process of the present invention are oligonucleotide having sequence (I) shown by sequence Nos. 1 and 2.

Also, the guanosine derivatives as described in the following Examples and Comparative Examples represent the compounds represented by the following structural formula. A circle as depicted in the following structural formula represents CPG schematically.

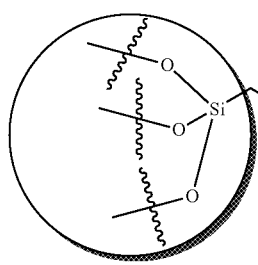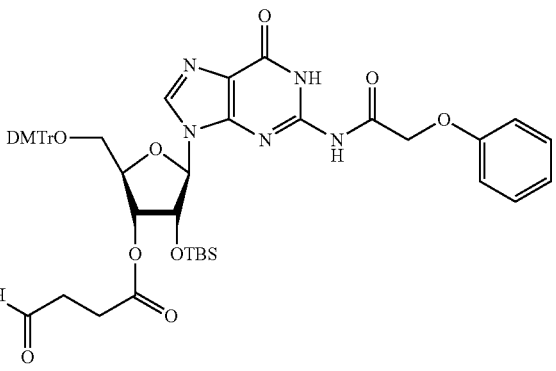

Example 1

Using CPG on which 78.20 µmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 16.46 µmol of oligonucleotide was supported was collected, and the oligonucleotide was cleaved from the solid support by aqueous ammonia. Next, the cleaved oligonucleotide was solubilized in 6.6 mL of dimethyl sulfoxide, and 1.97 µmol parts of the solution was collected in an egg-plant shaped flask having a volume of 100 mL and a caliber of 29 mm, and further thereto were added 10.6 µL nitromethane and a stir bar having a diameter of 15 mm, and then a flask was sealed by covering with a septum having a caliber of 29 mm. Further, a needle for blowing nitrogen gas from a nitrogen gas cylinder into the system, a needle for removing blown nitrogen, and further a needle for measurement equipped with Oxygen Meter were pierced onto the septum, and the atmosphere in the system was substituted with nitrogen gas by flowing nitrogen gas, and an oxygen concentration in gas phase was made 0%. Here the oxygen concentration in the gas phase was measured according to the method described in the above measurement method 3. Further, 1M tetra-n-butylammonium fluoride (TBAF) in dimethyl sulfoxide solution 1.10 mL (which was dehydrated with molecular sheave 4A) (the amount of TBAF was 10.2 moles per 1 mole of a protecting group) was added dropwise to a surface of oligonucleotide solution at 33° C. under stirring with a stir over 1 hour using a syringe pump (manufactured by KDScientific Inc.), and the resulting mixture was kept its temperature for 4 hours to deprotect a 2'-PMM protecting group. The crude product was obtained by a precipitation procedure. The yield was 14.1 mg, and the purity was 62%. As for the resulting crude product, the purity of the oligonucleotide was measured according to the method described in the above measurement method 1, and the yield of the oligonucleotide was measured according to the method described in the above measurement method 2.

Example 2

Using CPG on which 78.20 µmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 19.91 µmol of oligonucleotide was supported was collected, and the oligonucleotide was cleaved from the solid support by aqueous ammonia. Next, the cleaved oligonucleotide was solubilized in 8.0 mL of dimethyl sulfoxide, and 3.03 µmol parts of the solution was collected in an egg-plant shaped flask having a volume of 100 mL and a caliber of 29 mm, and further thereto were added 15.9 µL nitromethane and a stir bar having a diameter of 15 mm, and then a flask was sealed by covering with a septum having a caliber of 29 mm. Further, a needle for blowing nitrogen gas from a nitrogen gas cylinder into the system, a needle for removing blown nitrogen, and further a needle for measurement equipped with Oxygen Meter were pierced onto the septum, and the atmosphere in the system was substituted with nitrogen gas by flowing nitrogen gas, and an oxygen concentration in gas phase was made 0%. Here the oxygen concentration in the gas phase was measured in a similar manner to Example 1. Further, 1M tetra-n-butylammonium fluoride (TBAF) in dimethyl sulfoxide solution 1.66 mL (which was dehydrated with molecular sheave 4A) (the amount of TBAF was 10.0 moles per 1 mole of a protecting group) was flown to a surface of oligonucleotide solution at 33° C. under stirring with a stir within 1 minute using a syringe, and the resulting mixture was kept its temperature for 4 hours to deprotect a 2'-PMM protecting group. The crude product was obtained by a precipitation procedure. The yield was 21.7 mg, and the purity was 60%. The purity and yield of the obtained oligonucleotide were measured on the resulting crude products in a similar manner to Example 1.

Example 3

Using CPG on which 78.20 µmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 16.46 µmol of oligonucleotide was supported was collected, and the oligonucleotide was cleaved from the solid support by aqueous ammonia. Next, the cleaved oligonucleotide was solubilized in 6.6 mL of dimethyl sulfoxide, and 1.00 µmol parts of the solution was collected in an egg-plant shaped flask having a volume of 100 mL and a caliber of 29 mm, and further thereto were added 5.3 µL nitromethane and a stir bar having a diameter of 15 mm, and then a flask was sealed by covering with a septum having a caliber of 29 mm. Further, a needle for blowing nitrogen gas from a nitrogen gas cylinder into the system, a needle for removing blown nitrogen, and further a needle for measurement equipped with Oxygen Meter were pierced onto the septum, and the atmosphere in the system was substituted with nitrogen gas by flowing nitrogen gas, and an oxygen concentration in gas phase was made 5%. Here the oxygen concentration in the gas phase was measured in a similar manner to Example 1. Further, 1M tetra-n-butylammonium fluoride (TBAF) in dimethyl sulfoxide solution 0.56 mL (which was dehydrated with molecular sheave 4A) (the amount of TBAF was 10.2 moles per 1 mole of a protecting group) was flown to a surface of oligonucleotide solution at 33° C. under stirring with a stir within 1 minute using a syringe, and the resulting mixture was kept its temperature for 4 hours to deprotect a 2'-PMM protecting group. The crude product was obtained by a precipitation procedure. The yield was 7.1 mg, and the purity was 60%. The purity and yield of the obtained oligonucleotide were measured on the resulting crude products in a similar manner to Example 1.

Example 4

Using CPG on which 78.20 µmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 16.46 µmol of oligonucleotide was supported was collected, and the oligonucleotide was cleaved from the solid support by aqueous ammonia. Next, the cleaved oligonucleotide was solubilized in 6.6 mL of dimethyl sulfoxide, and 0.98 µmol parts of the solution was collected in an egg-plant shaped flask having a volume of 100 mL and a caliber of 29 mm, and further thereto were added 5.3 µL nitromethane and a stir bar having a diameter of 15 mm, and then a flask was sealed by covering with a septum having a caliber of 29 mm. Further, a needle for blowing nitrogen gas from a nitrogen gas cylinder into the system, a needle for removing blown nitrogen, and further a needle for measurement equipped with Oxygen Meter were pierced onto the septum, and the atmosphere in the system was substituted with nitrogen gas by flowing nitrogen gas, and an oxygen concentration in gas phase was made 10%. Here the oxygen concentration in the gas phase was measured in a similar manner to Example 1. Further, 1M tetra-n-butylammonium fluoride (TBAF) in dimethyl sulfoxide solution 0.56 mL (which was dehydrated with molecular sheave 4A) (the amount of TBAF was 10.4 moles per 1 mole of a protecting group) was flown to a surface of oligonucleotide solution at 33° C. under stirring with a stir within 1 minute using a syringe, and the resulting mixture was kept its temperature for 4 hours to deprotect a 2'-PMM protecting group. The crude product was obtained by a precipitation procedure. The yield was 6.9 mg, and the purity was 54%. The purity and yield of the obtained oligonucleotide were measured on the resulting crude products in a similar manner to Example 1.

Example 5

Using CPG on which 78.20 μmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 16.46 μmol of oligonucleotide was supported was collected, and the oligonucleotide was cleaved from the solid support by aqueous ammonia. Next, the cleaved oligonucleotide was solubilized in 6.6 mL of dimethyl sulfoxide, and 1.00 μmol parts of the solution was collected in an egg-plant shaped flask having a volume of 100 mL and a caliber of 29 mm, and further thereto were added 5.3 μL nitromethane and a stir bar having a diameter of 15 mm, and then a flask was sealed by covering with a septum having a caliber of 29 mm. Further, a needle for blowing nitrogen gas from a nitrogen gas cylinder into the system, a needle for removing blown nitrogen, and further a needle for measurement equipped with Oxygen Meter were pierced onto the septum, and the atmosphere in the system was substituted with nitrogen gas by flowing nitrogen gas, and an oxygen concentration in gas phase was made 15%. Here the oxygen concentration in the gas phase was measured in a similar manner to Example 1. Further, 1M tetra-n-butylammonium fluoride (TBAF) in dimethyl sulfoxide solution 0.56 mL (which was dehydrated with molecular sheave 4A) (the amount of TBAF was 10.2 moles per 1 mole of a protecting group) was flown to a surface of oligonucleotide solution at 33° C. under stirring with a stir within 1 minute using a syringe, and the resulting mixture was kept its temperature for 4 hours to deprotect a 2'-PMM protecting group. The crude product was obtained by a precipitation procedure. The yield was 7.1 mg, and the purity was 46%. The purity and yield of the obtained oligonucleotide were measured on the resulting crude products in a similar manner to Example 1.

Reference Example 1

Using CPG on which 78.20 μmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 19.91 μmol of oligonucleotide was supported was collected, and the oligonucleotide was cleaved from the solid support by aqueous ammonia. Next, the cleaved oligonucleotide was solubilized in 8.0 mL of dimethyl sulfoxide, and 1.01 μmol parts of the solution was collected in an egg-plant shaped flask having a volume of 100 mL and a caliber of 29 mm, and further thereto were added 5.3 μL nitromethane and a stir bar having a diameter of 15 mm, and then a flask was sealed by covering with a septum having a caliber of 29 mm. Further, a needle for measurement equipped with Oxygen Meter were pierced onto the septum, and the oxygen concentration in the gas phase was measured in a similar manner to Example 1, and an oxygen concentration in gas phase was made 21%. Further, 1M tetra-n-butylammonium fluoride (TBAF) in dimethyl sulfoxide solution 0.56 mL (which was dehydrated with molecular sheave 4A) (the amount of TBAF was 10.1 moles per 1 mole of a protecting group) was flown to a surface of oligonucleotide solution at 33° C. under stirring with a stir within 1 minute using a syringe, and the resulting mixture was kept its temperature for 4 hours to deprotect a 2'-PMM protecting group. The crude product was obtained by a precipitation procedure. The yield was 7.2 mg, and the purity was 41%. The purity and yield of the obtained oligonucleotide were measured on the resulting crude products in a similar manner to Example 1.

Reference Example 2

Using CPG on which 78.20 μmol guanosine derivative was supported, and each amidite represented by formula (A8), formula (A9), formula (A10), formula (A11), or formula (A12) respectively, a solid-phase synthesis of sequence (I) was carried out by a AKTA oligopilot plus 100. Thereafter, a CPG support on which 16.46 μmol of oligonucleotide was supported was collected, and the oligonucleotide was cleaved from the solid support by ammonia water. Next, the cleaved oligonucleotide was solubilized in 6.6 mL of dimethyl sulfoxide, and 1.96 μmol parts of the solution was collected in an egg-plant shaped flask having a volume of 100 mL and a caliber of 29 mm, and further thereto were added 10.6 μL nitromethane and a stir bar having a diameter of 15 mm, and then a flask was sealed by covering with a septum having a caliber of 29 mm. Further, a needle for measurement equipped with Oxygen Meter were pierced onto the septum, and the oxygen concentration in the gas phase was measured in a similar manner to Example 1, and an oxygen concentration in gas phase was made 21%. Further, 1M tetra-n-butylammonium fluoride (TBAF) in dimethyl sulfoxide solution 1.10 mL (which was dehydrated with molecular sheave 4A) (the amount of TBAF was 10.2 moles per 1 mole of a protecting group) was added dropwise to a surface of oligonucleotide solution at 33° C. under stirring with a stir over 1 hour using a syringe pump, and the resulting mixture was kept its temperature for 4 hours to deprotect a 2'-PMM protecting group. The crude product was obtained by a precipitation procedure. The yield was 14.2 mg, and the purity was 47%. The purity and yield of the obtained oligonucleotide were measured on the resulting crude products in a similar manner to Example 1.

The measurement results are shown in Table 2 below.

TABLE 2

| | Oxygen concentration | Duration required for TBAF addition | Duration of keeping temperature after completion of TBAF addition | Reaction Temperature | Relative yield per unit volume | Purity by HPLC measurement |
|---|---|---|---|---|---|---|
| Ex. 1 | 0% | 1 hr. | 4 hrs. | 33° C. | 1.00 | 62% |
| Ex. 2 | 0% | within 1 min. | 4 hrs. | 33° C. | 1.01 | 60% |
| Ex. 3 | 5% | within 1 min. | 4 hrs. | 33° C. | 0.99 | 60% |
| Ex. 4 | 10% | within 1 min. | 4 hrs. | 33° C. | 0.99 | 54% |
| Ex. 5 | 15% | within 1 min. | 4 hrs. | 33° C. | 0.99 | 46% |
| Ref. Ex. 1 | 21% | within 1 min. | 4 hrs. | 33° C. | 1.01 | 41% |
| Ref. Ex. 2 | 21% | 1 hr. | 4 hrs. | 33° C. | 1.02 | 47% |

As shown in the above Table 2, it is confirmed that when the deprotection reaction of a protecting group of hydroxy group of a ribose which is contained in oligonucleotide as described in Description was carried out under an atmosphere of an inert gas or inert gases containing 15% or less of oxygen concentration, compared to the case where the reaction was carried out under the atmosphere containing more than 15% of oxygen concentration, the deprotection reaction proceeded more effectively, and further, the deprotection reaction proceeded further more effectively by increasing the duration required for the TBAF addition to 30 minutes or more, and as a result, the purity of the resulting deprotected oligonucleotide was high.

Reference Example

Preparation of PMM Amidite
1) Preparation of 3-hydroxybutanenitrile

To propylene oxide (12.4 g, 0.21 mmol) was added lithium hydroxide monohydrate (1.8 g, 42.8 mmol), and the mixture was cooled to 4° C., and thereto was then added dropwise trimethylsilyl cyanide (15.5 g, 0.15 mol) slowly. After the dropwise addition was completed and several tens of minutes were passed, the inner temperature rose to 35° C. The mixture was stirred in ice bath (inner temperature 5° C.) for 30 minutes, at 10 to 15° C. for 1 hour, and further at room temperature (25° C.) for 30 minutes. To the reaction solution was added water (15 mL) and the mixture was stirred at room temperature for 30 minutes. Then the mixture was extracted with diethyl ether (50 mL×three(3) times), washed with saturated brine, and dried over anhydrous sodium sulfate, and the solvents were then distilled off to obtain crude 3-hydroxybutanenitrile as colorless and transparent liquid 10.6 g (yield 84%).
2) Preparation of a PMM Reagent

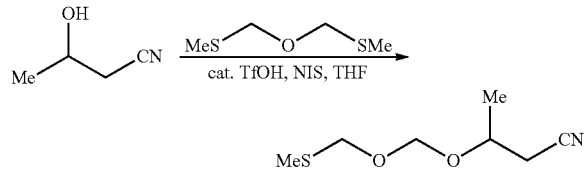

Bis(methylthiomethyl)ether (32.41 g, 0.234 mol, 2.0 eq.) was solubilized in dry THF (300 mL), and thereto was added molecular sieves 4A (32 g), and the mixture was stirred for 10 minutes. The mixture was cooled to −50° C., and thereto were added trifluromethanesulfonic acid (TfOH) (0.88 mL, 5.85 mmol, 0.05 eq.) and N-iodosuccinimide (NIS) (31.5 g, 0.140 mol, 1.2 eq.), and thereto was added dropwise crude 3-hydroxybutanenitrile (10 g, 0.117 mmol), and the mixture was stirred at around −50 to −45° C. for 2 hours. To the reaction solution were added saturated aqueous sodium sulfite solution (150 mL), saturated sodium hydrogen carbonate solution (150 mL) and ethyl acetate (300 mL), and the mixture was stirred at 0 to 10° C. for 10 minutes. After separating the mixture, an organic layer was washed with saturated brine (150 mL), dried over anhydrous magnesium sulfate, and the solvents were distilled off under reduced pressure. The residue was subjected to a silica gel column chromatography (Hexane/AcOEt=10/1 to 5/1, silica 800 mL) to obtain the PMM reagent as yellow liquid 5.9 g (Yield 28%). As a result of the GC/FID analysis on a purity of the product, the purity was 97.2%.

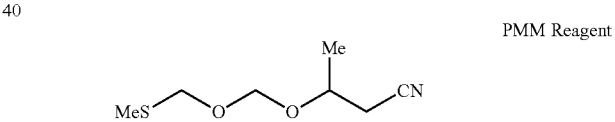

PMM Reagent

Pale Yellow Transparent Liquid
$^1$H-NMR (CDCl$_3$): δ4.93-4.84 (m, 2H) 4.75 (s, 2H) 4.06-4.00 (m, 1H) 2.57 (t, 2H), 2.17 (s, 3H) 1.35 (d, 3H)
Here the method for preparing bis(methylthiomethyl) ether is referred to JP 2016-50203 A1.
3) Preparation of PMM Reagent

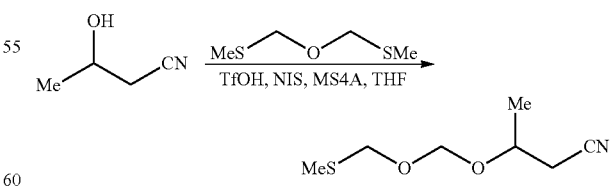

Bismethylthiomethyl ether (7.45 g, 53.9 mmol), molecular sieves 4A (7.5 g) and THF (111 mL) were mixed, and after cooling (−60 to −55° C.), thereto were added N-iodosuccinimide (NIS) (14.4 g, 1.19 equiv.), trifluoromethanesulfonic acid (TfOH) (143 μL, 0.030 equiv.), and 3-hydroxybutanenitrile (5.0 g, 1.09 equiv.). After the mixture was stirred at −50 to −45° C. for 4 hours, thereto was added dropwise triethylamine (5.1 mL). The reactor was immersed into water bath and the reaction solution was raised to around 10° C., and thereafter, the reaction solution was poured into an aqueous solution prepared in advance at 10° C. (a mixture of sodium thiosulfate pentahydrate 21.8 g, sodium bicarbonate 7.7 g, and water 165 mL). Thereto was added ethyl acetate (50 mL), and the mixture was stirred at 10 to 15° C. for 30 minutes, and after the mixture was filtered through Celite (7.5 g), the mixture was separated with a separatory funnel, and the organic layer was washed with saturated brine (30 mL), dried over magnesium sulfate (3.8 g), and concentrated with rotary evaporator to obtain 11.5 g of crude product (11.5 g, GC purity 49.8%). The product was purified with a silica gel column chromatography (silica gel 300 mL, hexane/ethyl acetate=10/1) to obtain 3-((methylthio methoxy)methoxy)butane nitrile (pale yellow transparent liquid, 5.32 g, yield 56%, purity 99.5%).

4) Preparation of Amidite

A preparation example of PMM amidite U wherein a nucleobase moiety is uracil is shown below. The PMM amidites containing the nucleobase moieties other than uracil can also be prepared by a similar process.

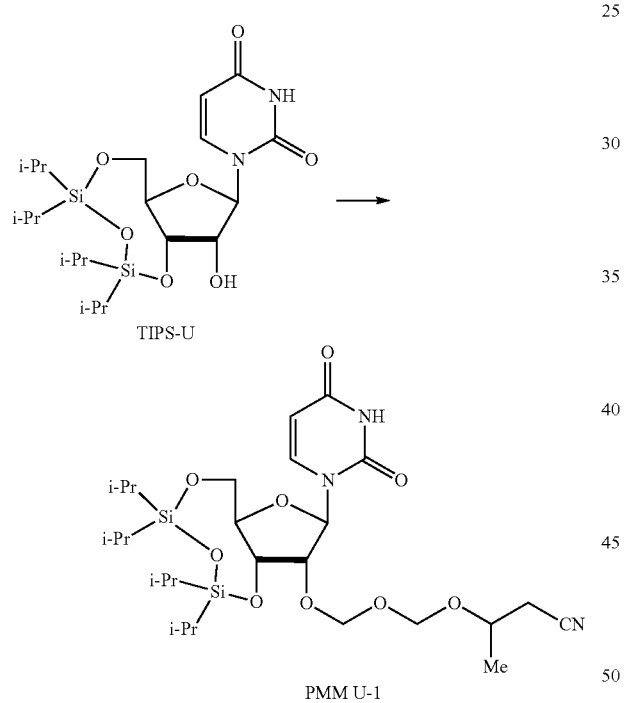

TIPS-U (20.0 g), THF (40 mL) and toluene (60 mL) were placed in a reactor, and the mixture was concentrated to 74 mL and dehydrated. The reaction solution was cooled to −50° C., and thereto were added dropwise a solution of the PMM reagent (10.80 g), TfOH (12.48 g), and NIS (12.4 g)/THF (26 mL). After the mixture was stirred at −50° C. for 2 hours, the reaction solution was poured into an ice-cooled solution of sodium hydrogen carbonate (7.0 g) and sodium thiosulfate (20.0 g)/water (130 mL), and the mixture was separated at room temperature. Thereafter, the mixture was washed with sodium hydrogen carbonate (3.5 g) and sodium thiosulfate (10.0 g)/water (65 mL). The organic layer was concentrated to obtain a crude product containing the desired compound. Exact Mass: 613.3, Actual Mass: 612.3 (ESI (−)).

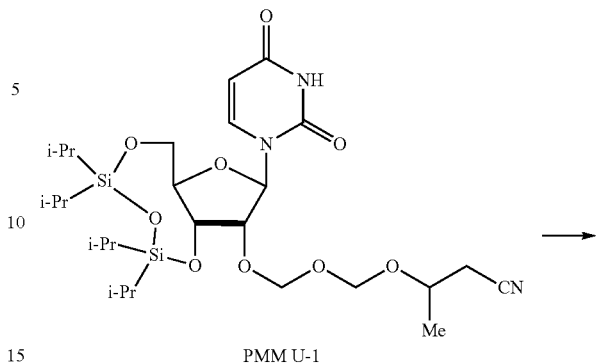

PMM U-1

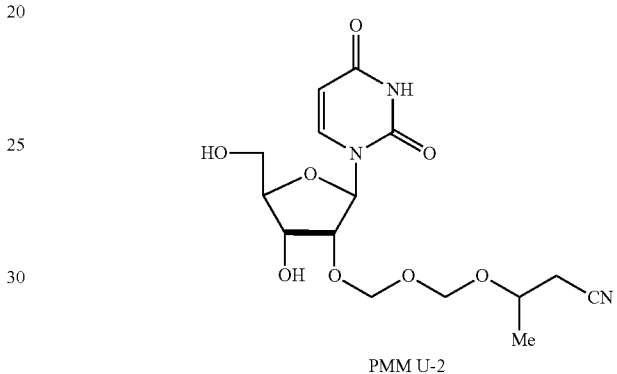

PMM U-2

The above crude PMM-U-1 was solubilized in acetone (40 mL), and thereto was added triethylamine trihydrofluoride (7.28 g), and the mixture was stirred at 20° C. for 18 hours. The reaction solution was poured into tert-butyl methyl ether (200 ml), and the mixture was stirred for 30 minutes. The reaction solution was filtered, and the solids remained on the filter were washed with tert-butyl methyl ether (40 mL), and the resulting precipitates were collected, and dried under reduced pressure to obtain a crude product (14.56 g) containing the desired product. Exact Mass: 371.1, Actual Mass: 370.2 (ESI (−)).

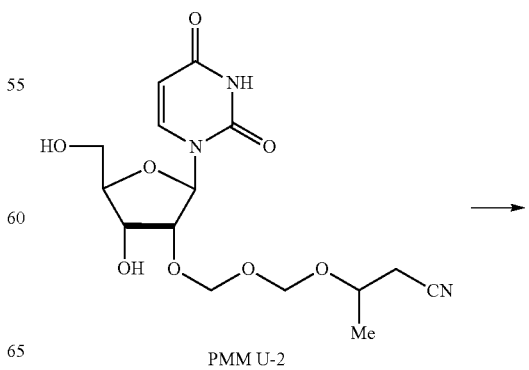

PMM U-2

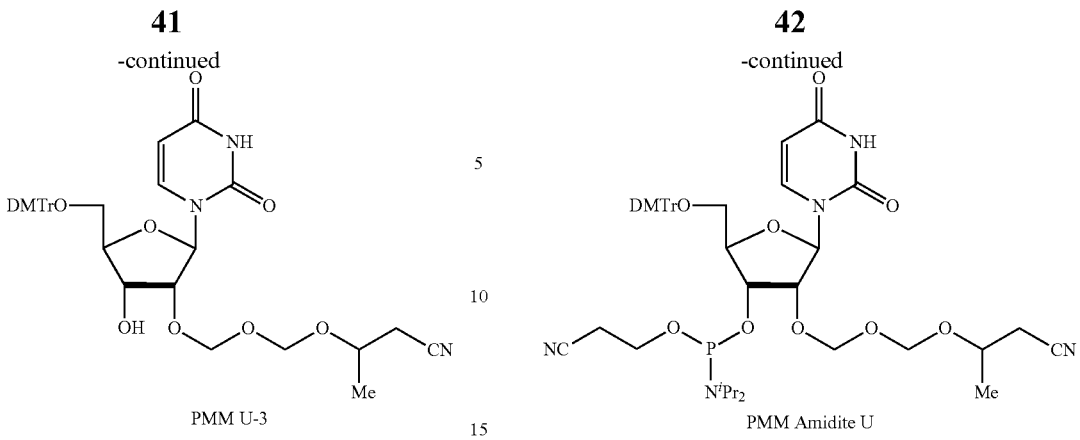

PMM U-3

PMM Amidite U

The above crude PMM-U-2 (14.5 g), pyridine (72.5 ml) and acetonitrile (29 mL) and toluene (72.5 mL) were placed in a reactor vessel and ice-cooled. To the mixture was added 4,4'-dimethoxytritylchloride (15.86 g) and the mixture was stirred at room temperature for 4 hours. Thereafter, thereto were added methanol (7.2 mL) and toluene (29 mL), and the mixture was washed with 5% aqueous sodium hydrogen carbonate solution (43.5 mL) twice and 10% aqueous sodium chloride solution (43.5 mL) once. Thereafter, the organic layer was concentrated. The concentrates were purified by a silica gel column chromatography to obtain the desired product (21.12 g). Exact Mass: 673.3, Actual Mass: 672.3 (ESI (−)).

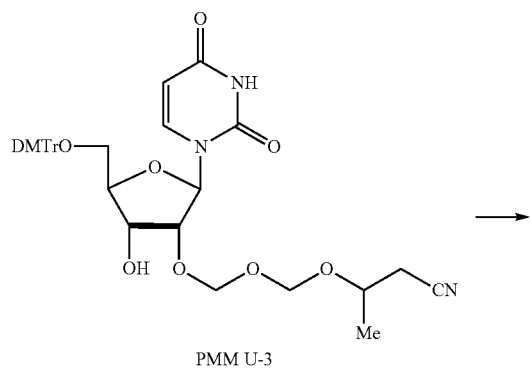

PMM U-3

PMM-U-3 (20.0 g), acetonitrile (60 mL), diisopropyl ammonium tetrazolide (5.88 g), and 2-cyanoethyl-N,N,N',N'-tetraisopropyl phosphorodiamidite (10.75 g) were placed in a reactor, and the mixture was stirred at 35° C. for 4 hours. To the reaction solution was added toluene (200 mL), and the mixture was washed with 5% aqueous sodium hydrogen carbonate solution (100 mL) once, 50% aqueous DMF solution (200 mL) five times, water (100 mL) twice, and 10% aqueous sodium chloride solution (100 mL) once. Thereafter, the organic layer was concentrated, and purified by a silica gel column chromatography to obtain the desired product (22.72 g).

The present invention provides an efficient process for preparing a nucleic acid oligomer. It can be expected an improvement in purity of nucleic acid oligomer that is prepared according to a process for preparing a nucleic acid oligomer.

FREE TEXT OF SEQUENCE LISTING

Sequence Nos. 1 to 13 in Sequence Listing represent a nucleotide sequence of oligonucleotide that is prepared according to the process of the present invention.

The invention claimed is:

1. A process for preparing a nucleic acid oligomer represented by formula (4):

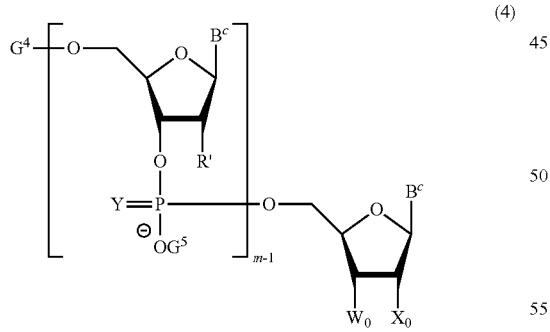

wherein in the formula (4),

R' each independently represents a hydroxy group, a hydrogen atom, a fluorine atom, a methoxy group, a 2-methoxyethyl group, or OQ' group, Q' each independently represents a methylene group which is bonded to a carbon atom at 4' position of ribose, an ethylene group which is bonded to a carbon atom at 4' position of ribose, or an ethylidene group which is bonded to a carbon atom at 4' position of ribose, $G^4$ represents a hydrogen atom or a protecting group of hydroxy group, $G^5$ represents an ammonium ion, an alkylammonium ion, an alkali metal ion, a hydrogen ion or a hydroxyalkylammonium ion, $B^c$ represents a nucleobase, each of which is independently identical to or different from each other, Y each independently represents an oxygen atom or a sulfur atom, m is an integer of 2 or more to 200 or less, $W_0$ represents a hydroxy group, $X_0$ each independently represents a hydroxy group, a hydrogen atom, a fluorine atom, a methoxy group, a 2-methoxyethyl group, or OQ' group, when m is an integer of 3 or more, the nucleic acid oligomer represented by formula (4) represents a nucleic acid oligomer which may have a non-nucleotide linker replacing a number of nucleotides, p, between the respective nucleotides at the 5' terminus and the 3' terminus, with the proviso that p is a positive integer satisfying the equation: m−1>p, the method comprising:

contacting a nucleic acid oligomer represented by formula (3) with a fluoride ion under an atmosphere of an inert gas or inert gases containing 15% or less of oxygen concentration:

(3)

[Chemical structure of formula (3) showing nucleotide with G⁴—O, Bᶜ, Y=P, OG⁵, W, X, R groups, with subscript m-1]

wherein in the formula (3),
- G⁴ represents a hydrogen atom or a protecting group of hydroxy group,
- G⁵ represents an ammonium ion, an alkylammonium ion, an alkali metal ion, a hydrogen ion or a hydroxyalkylammonium ion,
- Bᶜ represents a nucleobase, each of which is independently identical to or different from each other,
- R each independently represents a hydrogen atom, a fluorine atom or OQ group,
- Q is identical to or different from each other and each independently represents a tert-butyldimethylsilyl group, a methyl group, a 2-methoxyethyl group, a methylene group which is bonded to a carbon atom at 4' position of ribose, an ethylene group which is bonded to a carbon atom at 4' position of ribose, an ethylidene group which is bonded to a carbon atom at 4' position of ribose, or a protecting group represented by formula (1):

(1)

[Chemical structure of formula (1) showing *—[O—]ₙ—O—C(Rᵃ)(Rᵇ)—CN]

wherein in the formula (1),
- Rᵃ and Rᵇ are identical to or different from each other and each independently represents a methyl group, an ethyl group or a hydrogen atom,
- a bond marked with * represents a bond to an oxygen atom of OQ group,
- n is any integer of 1 to 5,
- with the proviso that Rᵃ and Rᵇ do not represent a hydrogen atom at the same time,
- Y each independently represents an oxygen atom or a sulfur atom,
- m is an integer of 2 or more to 200 or less,
- W and X are defined as either the following (a) or (b):
  - (a) when W represents a hydroxy group, X is the same as defined as those of the above R group,
  - (b) when X represents a hydroxy group, W represents a OV group,
- V represents a tert-butyldimethylsilyl group, or the group represented by the above formula (1),
- with the proviso that at least one group selected from the above R group, W group and X group represents a hydroxy group which is protected with a protecting group represented by the above formula (1), and
- when m is an integer of 3 or more, the nucleic acid oligomer represented by formula (3) represents a nucleic acid oligomer which may have a non-nucleotide linker replacing a number of nucleotides, p, between the respective nucleotides at the 5' terminus and the 3' terminus, with the proviso that p is a positive integer satisfying the equation: m−1<p.

2. The process according to claim 1, wherein the non-nucleotide linker is a linker comprising an amino acid backbone.

3. The process according to claim 2, wherein the linker comprising an amino acid backbone is a linker having a structure selected from the following formula (A14-1), (A14-2) or (A14-3):

(A14-1)

[Chemical structure of formula (A14-1) showing proline-based linker with 5' terminus]

(A14-2)

[Chemical structure of formula (A14-2) showing lysine-based linker with NH₂ group, G⁵O, Y=P, and 5' terminus connections]

(A14-3)

[Chemical structure of formula (A14-3) showing lysine-based linker with HN—C(=O)—CF₃ group, G⁵O, Y=P, and 5' terminus connections]

wherein a symbol of 5' and 3' represents a 5' terminus side and 3' terminus side respectively of the nucleic acid oligomer.

4. The process according to claim 1, wherein W represents a hydroxy group, X represents a R group, W₀ represents a hydroxy group, and X₀ represents a R' group.

5. The process according to claim 1, wherein the fluoride ion source is tetraalkylammonium fluoride.

6. The process according to claim 1, wherein the tetraalkylammonium fluoride is tetra-n-butylammonium fluoride (TBAF).

7. The process according to claim 1, wherein the reaction is conducted under an atmosphere of an inert gas or inert gases containing 10% or less of oxygen concentration.

8. The process according to claim 1, wherein the reaction is conducted under an atmosphere of an inert gas or inert gases containing 5% or less of oxygen concentration.

9. The process according to claim 1, wherein the reaction is conducted under an atmosphere of an inert gas or inert gases containing 0% of oxygen concentration.

10. The process according to claim 1, wherein a duration required for addition of the total amounts of fluoride ions to the nucleic acid oligomer represented by formula (3) is 30 minutes or more.

11. The process according to claim 1, wherein among the R group, the W group, and the X group in the nucleic acid oligomer represented by formula (3), the ratio of a protecting group represented by the above formula (1) is 5% or more.

12. The process according to claim 1, wherein among the R group, the W group, and the X group in the nucleic acid oligomer represented by formula (3), the ratio of a protecting group represented by the above formula (1) is 10% or more.

13. The process according to claim 1, wherein among the R group, the W group, and the X group in the nucleic acid oligomer represented by formula (3), the ratio of a protecting group represented by the above formula (1) is 20% or more.

14. The process according to claim 1, wherein among the R group, the W group, and the X group in the nucleic acid oligomer represented by formula (3), the ratio of a protecting group represented by the above formula (1) is 30% or more.

15. The process according to claim 1, wherein among the R group, the W group, and the X group in the nucleic acid oligomer represented by formula (3), the ratio of a protecting group represented by the above formula (1) is 40% or more.

16. The process according to claim 1, wherein among the R group, the W group, and the X group in the nucleic acid oligomer represented by formula (3), the ratio of a protecting group represented by the above formula (1) is 50% or more.

17. The process according to claim 1, wherein among the R group, the W group, and the X group in the nucleic acid oligomer represented by formula (3), the ratio of a protecting group represented by the above formula (1) is 60% or more.

18. The process according to claim 1, wherein among the R group, the W group, and the X group in the nucleic acid oligomer represented by formula (3), the ratio of a protecting group represented by the above formula (1) is 70% or more.

19. The process according to claim 1, wherein among the R group, the W group, and the X group in the nucleic acid oligomer represented by formula (3), the ratio of a protecting group represented by the above formula (1) is 80% or more.

20. The process according to claim 1, wherein among the R group, the W group, and the X group in the nucleic acid oligomer represented by formula (3), the ratio of a protecting group represented by the above formula (1) is 90% or more.

21. The process according to claim 1, wherein among the R group, the W group, and the X group in the nucleic acid oligomer represented by formula (3), the ratio of a protecting group represented by the above formula (1) is 95% or more.

22. The process according to claim 1, wherein among the R group, the W group, and the X group in the nucleic acid oligomer represented by formula (3), the ratio of a protecting group represented by the above formula (1) is 100%.

* * * * *

SEQUENCE LISTING

```
<160> NUMBER OF SEQ ID NOS: 13

<210> SEQ ID NO 1
<211> LENGTH: 24
<212> TYPE: RNA
<213> ORGANISM: Artificial Sequence
<220> FEATURE:
<223> OTHER INFORMATION: Synthetic oligonucleotide

<400> SEQUENCE: 1
agcagaguac acacagcaua uacc                                             24

<210> SEQ ID NO 2
<211> LENGTH: 26
<212> TYPE: RNA
<213> ORGANISM: Artificial Sequence
<220> FEATURE:
<223> OTHER INFORMATION: Synthetic oligonucleotide
```

<400> SEQUENCE: 2
gguauaugcu guguguacuc ugcuuc                                        26

<210> SEQ ID NO 3
<211> LENGTH: 21
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (7)..(7), (17)..(17)
<223> OTHER INFORMATION: um
<220> FEATURE:
<221> NAME/KEY: modified_base
<222> LOCATION: (20)..(21)
<223> OTHER INFORMATION: thymidine(dT)

<400> SEQUENCE: 3
auggaanacu cuuggunacn n                                             21

<210> SEQ ID NO 4
<211> LENGTH: 21
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (2)..(2), (12)..(12), (14)..(15), (19)..(19)
<223> OTHER INFORMATION: um
<220> FEATURE:
<221> NAME/KEY: modified_base
<222> LOCATION: (5)..(6), (16)..(17)
<223> OTHER INFORMATION: cm
<220> FEATURE:
<221> NAME/KEY: modified_base
<222> LOCATION: (20)..(21)
<223> OTHER INFORMATION: thymidine(dT)

<400> SEQUENCE: 4
gnaannaaga gnannnnann n                                             21

<210> SEQ ID NO 5
<211> LENGTH: 36
<212> TYPE: DNA
<213> ORGANISM: Artificial Sequence
<220> FEATURE:
<223> OTHER INFORMATION: Synthetic oligonucleotide

<400> SEQUENCE: 5
agagccagcc uucuuauugu uuuagagcua ugcugu                             36

<210> SEQ ID NO 6
<211> LENGTH: 23
<212> TYPE: RNA
<213> ORGANISM: Artificial Sequence
<220> FEATURE:
<223> OTHER INFORMATION: Synthetic oligonucleotide

<400> SEQUENCE: 6
ccaugagaag uaugacaaca gcc                                           23

<210> SEQ ID NO 7
<211> LENGTH: 25
<212> TYPE: RNA
<213> ORGANISM: Artificial Sequence
<220> FEATURE:

<223> OTHER INFORMATION: Synthetic oligonucleotide

<400> SEQUENCE: 7
ggcuguuguc auacuucuca ugguu                                      25

<210> SEQ ID NO 8
<211> LENGTH: 67
<212> TYPE: DNA
<213> ORGANISM: Artificial Sequence
<220> FEATURE:
<223> OTHER INFORMATION: Synthetic oligonucleotide

<400> SEQUENCE: 8
acagcauagc aaguuaaaau aaggcuaguc cguuaucaac uugaaaaagu ggcaccgagu    60
cggugcu                                                             67

<210> SEQ ID NO 9
<211> LENGTH: 94
<212> TYPE: DNA
<213> ORGANISM: Artificial Sequence
<220> FEATURE:
<223> OTHER INFORMATION: Synthetic oligonucleotide

<400> SEQUENCE: 9 guuuuccuu uucaaagaaa ucuccgggc accaucuuc uuaggugccc ucccuuguuu       60
aaaccugacc aguuaaccgg cugguuaggu uuuu                                94

<210> SEQ ID NO 10
<211> LENGTH: 100
<212> TYPE: DNA
<213> ORGANISM: Artificial Sequence
<220> FEATURE:
<223> OTHER INFORMATION: Synthetic oligonucleotide

<400> SEQUENCE: 10
aguccucauc ucccucaagc guuuuagagc uaguaauagc aaguuaaaau aaggcuaguc    60
cguuaucaac uugaaaaagu ggcaccgagu cggugcuuuu                         100

<210> SEQ ID NO 11
<211> LENGTH: 113
<212> TYPE: DNA
<213> ORGANISM: Artificial Sequence
<220> FEATURE:
<223> OTHER INFORMATION: Synthetic oligonucleotide

<400> SEQUENCE: 11
gcagauguag uguuccaca guuuaagagc uaugcuggaa acagcauagc aaguuuaaau    60
aaggcuaguc cguuaucaac uugaaaaagu ggcaccgagu cggugcuuuu uuu          113

<210> SEQ ID NO 12
<211> LENGTH: 113
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (1)..(1), (8)..(8), (17)..(18)
<223> OTHER INFORMATION: thymidine(dT)
<220> FEATURE:
<221> NAME/KEY: modified_base
<222> LOCATION: (2)..(2), (19)..(19)
<223> OTHER INFORMATION: 2'-deoxyguanosine
<220> FEATURE:
<221> NAME/KEY: modified_base

```
<222> LOCATION: (3)..(3), (6)..(6), (9)..(9), (11)..(11), (15)..(15)
<223> OTHER INFORMATION: 2'-deoxythymidine
<220> FEATURE:
<221> NAME/KEY: modified_base
<222> LOCATION: (4)..(5), (7)..(7), (10)..(10), (12)..(14), (16)..(16),
      (20)..(20)
<223> OTHER INFORMATION: 2'-deoxycytidine

<400> SEQUENCE: 12
nnnnnnnnnn nnnnnnnnnn guuuaagagc uaugcuggua acagcauagc aaguuuaaau    60
aaggcuaguc cguuaucaac uugaaaaagu ggcaccgagu cggugcuuuu uuu           113

<210> SEQ ID NO 13
<211> LENGTH: 113
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (1)..(1)
<223> OTHER INFORMATION: phosphorothioate derivative of
      2'-O-methyladenosine
<220> FEATURE:
<221> NAME/KEY: modified_base
<222> LOCATION: (2)..(2)
<223> OTHER INFORMATION: phosphorothioate derivative of
      2'-O-methylguanosine (gm)
<220> FEATURE:
<221> NAME/KEY: modified_base
<222> LOCATION: (3)..(3), (110)..(112)
<223> OTHER INFORMATION: phosphorothioate derivative of
      2'-O-methyluridine (um)

<400> SEQUENCE: 13
nnnccucauc ucccucaagc guuuaagagc uaugcuggua acagcauagc aaguuuaaau    60
aaggcuaguc cguuaucaac uugaaaaagu ggcaccgagu cggugcuuun nnu           113
```